US012121840B2

(12) United States Patent
Carr et al.

(10) Patent No.: US 12,121,840 B2
(45) Date of Patent: Oct. 22, 2024

(54) MULTI-PIECE HVAC AIR FILTER HOUSING, FILTER ASSEMBLY AND METHODS

(71) Applicant: Airotrust LLC, Livonia, MI (US)

(72) Inventors: Matthew J. Carr, White Lake, MI (US); Glenn R. Sprague, Brighton, MI (US)

(73) Assignee: Airotrust LLC, Livonia, MI (US)

( * ) Notice: Subject to any disclaimer, the term of this patent is extended or adjusted under 35 U.S.C. 154(b) by 369 days.

(21) Appl. No.: 17/566,025

(22) Filed: Dec. 30, 2021

(65) Prior Publication Data

US 2022/0233983 A1    Jul. 28, 2022

Related U.S. Application Data

(60) Provisional application No. 63/140,368, filed on Jan. 22, 2021.

(51) Int. Cl.
*B01D 46/00*    (2022.01)
*B01D 46/10*    (2006.01)
*F24F 8/108*    (2021.01)

(52) U.S. Cl.
CPC ......... *B01D 46/0005* (2013.01); *B01D 46/10* (2013.01); *F24F 8/108* (2021.01); *B01D 2265/028* (2013.01); *B01D 2279/50* (2013.01)

(58) Field of Classification Search
CPC ........................ B01D 46/0002; B01D 46/0005
See application file for complete search history.

(56) References Cited

U.S. PATENT DOCUMENTS

| 3,136,617 | A | 6/1964 | Wachter |
| D234,692 | S | 4/1975 | Laakkonen et al. |
| 3,999,969 | A | 12/1976 | Shuler |

(Continued)

FOREIGN PATENT DOCUMENTS

| WO | 2004050344 A1 | 6/2004 |
| WO | 2006117726 A1 | 11/2006 |
| WO | 2007149899 A2 | 12/2007 |

OTHER PUBLICATIONS

Ceiling Mount Plenum Return. "Cube Core Return Filter." www.Amazon.com. Online Sales website. Tues. May 16, 2023. Shown in pp. 1-7, Part No. CRFG3030, , URL; <https://www.amazon.com/dp/B07M7PY2S3/>. (7pages).

(Continued)

*Primary Examiner* — Robert A Hopkins

(57) ABSTRACT

A multi-piece air filter housing, air filter assembly, and method for assembling an air filter for use with a heating, ventilation, and air conditioning (HVAC) systems or stand alone air circulation devices. In one example at least a first sidewall section and a second sidewall section include sidewall connectors allowing the first and second sidewall sections to be connected defining an interior cavity for receipt and support of air filter media. In one example, the air filter housing includes four modular sidewall sections that are connected together to form the air filter housing. A housing connector is used to secure the air filter housing and filter media circumferentially around a forced air passage opening to direct airflow through the air filter housing and filter media. In one example, the air filter assembly is useful for suspending ceiling HVAC vents.

17 Claims, 18 Drawing Sheets

(56) References Cited

U.S. PATENT DOCUMENTS

| | | | |
|---|---|---|---|
| 4,177,050 A | 12/1979 | Culbert et al. | |
| 4,344,784 A | 8/1982 | Deckas et al. | |
| 4,626,265 A | 12/1986 | Adiletta | |
| 4,885,015 A | 12/1989 | Goulet et al. | |
| 5,161,573 A | 11/1992 | Krupp | |
| D335,173 S | 4/1993 | Leufstedt et al. | |
| 5,525,145 A | 6/1996 | Hodge | |
| 5,733,348 A * | 3/1998 | Skarsten | B01D 46/10 55/482 |
| 6,061,981 A | 5/2000 | Nieves | |
| 6,361,578 B1 | 3/2002 | Rubinson | |
| 6,461,396 B1 | 10/2002 | Barker et al. | |
| 6,464,745 B2 * | 10/2002 | Rivera | B01D 46/523 55/497 |
| 7,422,273 B2 | 9/2008 | Varga | |
| 7,575,617 B2 | 8/2009 | Ferguson | |
| D655,802 S | 3/2012 | Platt | |
| 8,292,708 B2 | 10/2012 | Viggers et al. | |
| 8,460,419 B1 | 6/2013 | Hobbs | |
| 8,540,792 B2 | 9/2013 | Crook | |
| 8,979,965 B2 | 3/2015 | Minaeeghainipour | |
| 9,011,565 B2 | 4/2015 | Cannon | |
| 9,320,996 B1 | 4/2016 | Baldwin, Jr. | |
| D778,419 S | 2/2017 | Poindexter | |
| 2003/0066423 A1 | 4/2003 | Shah et al. | |
| 2003/0205039 A1 | 11/2003 | Terlson | |
| 2006/0053759 A1 | 3/2006 | Winters et al. | |
| 2006/0117726 A1 | 6/2006 | Moreno | |
| 2008/0184685 A1 | 8/2008 | Kempf et al. | |
| 2009/0084050 A1 | 4/2009 | Moore et al. | |
| 2011/0023721 A1 | 2/2011 | Tanis et al. | |
| 2014/0109534 A1 | 4/2014 | Rahmathullah et al. | |
| 2019/0054408 A1 | 2/2019 | McLaughlin | |
| 2019/0381437 A1 | 12/2019 | Perl-Olshvang et al. | |
| 2021/0197112 A1 | 7/2021 | Barry et al. | |
| 2022/0233983 A1 | 7/2022 | Carr et al. | |

OTHER PUBLICATIONS

Elima-Draft Residential and Commercial Magnetic HVAC Vent Covers; Filtration Vent Covers; https: www.elima-draft.com; accessed via internet at https://www.elima-draft.com/filtration-vent-covers/ on Jul. 30, 2020; pp. 1-8.

Elima-Draft Residential and Commercial Magnetic HVAC Vent Covers; Commercial Vent Covers; https: www.elima-draft.com; accessed via internet at https://www.elima-draft.com/commercial-vent-covers/ on Jul. 30, 2020; pp. 1-7.

Design U.S. Appl. No. 29/744,698, filed Jul. 30, 2020.

Design U.S. Appl. No. 29/767,456, filed Jan. 22, 2021.

* cited by examiner

MULTI-PIECE HVAC AIR FILTER HOUSING, FILTER ASSEMBLY AND METHODS

CROSS-REFERENCE TO RELATED APPLICATIONS

This US utility patent application claims priority benefit to U.S. provisional patent application Ser. No. 63/140,368 filed Jan. 22, 2021, the entire contents of which is incorporated herein by reference.

TECHNICAL FIELD

This disclosure relates to air filter devices for heating, ventilation and air conditioning (HVAC) systems and other forced air flow products and devices.

BACKGROUND

Air quality inside of commercial and residential buildings has long been important and a priority to providing a healthy work or living environment for occupants. With the rise of a world-wide viral pandemic which easily spreads through the air, healthy air quality is increasingly important in commercial buildings where large numbers of occupants work in close proximity and spend a significant amount of time in the enclosed environment. In other commercial buildings, for example municipal and federal office buildings, law enforcement and defense facilities, public and private schools, retail stores, restaurants and other services establishments, a high volume of daily foot or people traffic enter and exit the buildings each day which increases the opportunity to compromise the air quality.

Conventional air filters used in large commercial buildings are typically positioned in large heating, ventilation and air conditioning (HVAC) systems on the roofs of the buildings near the fan blower motors which are out of sight of the occupants and require service or maintenance by professionals or building maintenance staff. As these filters are out of sight, there is a tendency or likelihood that the filters will not be maintained or replaced regularly or as recommended by the filter manufacturers. There is further a concern with these conventional HVAC systems in that since the filter media is positioned at the front or upstream end of the air flow path, the filters may unduly restrict the air flow into the working spaces and/or cause the large blower motors to work harder to maintain circulation causing premature wear of the costly circulation motors and other system components. Another disadvantage to conventional HVAC systems is that inevitably over time, dust and other air debris or particles accumulate on the visible exhaust vents which are largely overlooked by typical cleaning procedures. These dusty, partially clogged vents are unsightly and further the opportunity for germs or other unhealthy conditions to develop negatively impacting air quality.

Other conventional air filter devices have been used on the interior of commercial or residential buildings. In commercial buildings with suspended ceilings, conventional devices have been placed above the suspended ceilings, out of sight of occupants and maintenance personnel, and are subject to the same disadvantages as the roof top filtration systems discussed above. Other conventional air filter devices include a housing or frame which holds a filter media have been used to attach to the floor or wall vent or louver structures and extend into the working or living space. These devices suffer from significant disadvantages of not being able to be used with high quality commercially-available filter cartridges needed for high air quality. These devices further have been designed to be large, single piece structures which are not economical to ship or store in large quantities. Due to the single-piece, often irregular sized components, low quantities can be packaged in boxes for shipment which reduces efficiency and increases costs to manufacturers. Once onsite, the conventional and/or single piece frames or components take up a large amount of storage space which is often very limited.

There is a need in conventional air filter devices and systems to resolve or greatly improve on these many disadvantages. There is a further need to provide an air filter device and method which is easy to use and maintain, economical to manufacture, transport and store, and that is visible to occupants to provide a level of confidence in air quality and health security, and that improves air filtration and air quality in working and living spaces.

SUMMARY

Disclosed herein is a multi-piece filter housing, filter assembly, and methods of assembly and installation useful in forced-air HVAC systems and other forced-air or air circulation devices. The invention is particularly, but not exclusively, useful in commercial buildings with common suspended ceilings with forced air passage openings or vents which exhaust or blow air into, or remove air from, interior working spaces. The air filter housing, and in the form of an air filter assembly, is operable to accept commercially-available, standard-sized, high quality air filter media or cartridges and easily connects to the suspended ceiling support grid around the forced-air passage opening extending into the working space. The invention is also useful in many other applications including residential HVAC systems and other forced-air products or devices, for example standalone electric circulation fans commonly used in residential and commercial spaces.

In one example of the invention, a multi-piece air filter housing includes at least a first sidewall section and a second sidewall section each including a sidewall having a first end and a second end, an upper end, and a lower end and a filter media stop connected to at least one of the first sidewall section or the second sidewall section. A sidewall connector is operable to connect the at least first sidewall and the second sidewall together which define an interior cavity for receipt of the air filter media. The sidewall connector allows easy and secure connection of the first sidewall section and the second sidewall section together forming a rigid, or substantially rigid, air filter housing. A housing connector is used to secure the connected first sidewall section and the second sidewall section circumferentially around a forced-air passage opening.

In one example, the filter media stop is connected to each of the first sidewall section and the second sidewall section which extends inward from the sidewalls providing a support surface for the air filter media positioned in the interior cavity. Once an air filter media is installed in the interior cavity of the housing, the filter media stop supports the air filter media to direct forced-air passing through the air filter media either into a working space, or removing air from the working space.

In one example, the at least first sidewall section and the second sidewall section include a total of four modular sidewall sections of the same, or substantially the same, configuration, including a first sidewall section, a second sidewall section, a third sidewall section, and a fourth sidewall section. Each sidewall section having a sidewall including the first end and the second end, the upper end and the lower end, the filter media stop, the sidewall connector (to connect the four sidewall sections together to form the air filter housing and interior cavity), and the housing connector (to connect the assembled air filter housing and installed filter media around the forced air passage opening). The four modular sidewall sections when connected, form the rigid or substantially rigid air filter housing. When the four sidewall sections are not connected together, the four modular sidewall sections are highly compact and efficient to manufacture, ship, and store in contrast to conventional air filter housings and air filter assemblies described above, for example single piece frames or housings. In the field, the four modular sidewall sections are easily assembled to form the air filter housing, receive the air filter media, and be installed.

In one example, the sidewall connectors are integral with the sidewall sections and include a first sidewall connector and a complimentary second sidewall connector. In one example the first sidewall connector is an elongate angled tab on the first end of the sidewall, and the second sidewall connector is a complimentary elongate angled channel defining an angled slot on the second end of the sidewall. The complimentary angled tab and angled slot allow for secure, sliding and frictional engagement of the sidewall sections to form the interior cavity for receipt of the air filter media.

In one example, the filter media stop includes a lower flange extending inward from the lower end of the sidewall and defines a housing air passage opening allowing forced air to pass through the filter media and through the housing air passage opening into the working space. Alternately, in a forced air return example, the drawn air passes through the housing air passage opening and the through the filter media. In one example, the housing air passage opening is defined by distal ends of the lower flanges and is unobstructed by the air filter housing between the lower flange distal ends allowing substantially all of the filter media to be visibly seen through the housing air passage opening from the working space.

In one example, the at least first and second sidewall sections also include an upper flange that extends outward from the sidewalls. In one example, the housing connector is a plurality of magnets that are connected to the upper flange. In one example, the forced-air passage opening is defined by a frame including a suspended ceiling support grid made from a ferrous metal material. The magnets provide a removable but secure connection for the air filter housing, or air filter assembly including the installed air filter media, to the suspended ceiling support grid circumferentially surrounding the HVAC forced-air passage opening or vent. In one example, a seal is connected to the upper flange which is operable to further direct the forced-air to pass through the air filter media, and through the housing air passage opening.

In one example of an air filter assembly, the air filter housing is operable to receive the air filter media in an interior cavity of the air filter housing. A housing connector is used to secure the air filter housing and installed air filter media circumferentially around the forced-air passage opening. In one example, the air filter media consists of a standard-sized, high quality, commercially-available air filter cartridge that is easily installed in the assembled air filter housing and replaced when needed.

In an exemplary method for assembling an air filter housing, at least a first sidewall section and a second sidewall section are provided which each include a sidewall having a first end, a second end, an upper end, a lower end, and a filter media stop. In one example four modular sidewall sections are used including these same features. A sidewall connector is aligned with the at least first sidewall section and the second sidewall section and is used to connect the first sidewall section and second sidewall section together defining the interior cavity operable to receive an air filter media. In one example, a housing connector is attached to the assembled air filter housing and is operable to connect the assembled air filter housing (and when installed, a filter media) around a forced air passage opening to filter the air flow.

In one example of a method for installing an air filter assembly, the air filter housing is assembled by connecting the at least first sidewall section and the second sidewall section together through use of the sidewall connectors. In one example, the air filter housing includes four modular sidewall sections including integral sidewall connectors. An air filter media or cartridge is installed in the assembled air filter housing interior cavity and the air filter housing and installed air filter media is positioned circumferentially around a forced air passage opening. The housing connector is used to connect the air filter assembly around the forced air passage opening. In one example, the forced air passage opening is in a suspended ceiling and defined by a frame of a suspended ceiling support grid.

The inventions described herein provide numerous and significant advantages over conventional air filter housings and air filter assembly designs. The multi-piece air filter housing with connecting sidewall sections minimizes the space needed for shipping and storage in all stages of manufacturing and in the field, while providing a rigid structure and an interior cavity for receipt of high quality, commercial-grade, commonly available air filter media for improved air quality. The design of the sidewall sections provides for easy assembly (and disassembly) with minimal, or reduced, air leakage. Use in the form of an air filter assembly with a commercial-grade air filter media cartridge has shown to provide significant improvements in filtered air quality in working and living spaces. In one application, the inventive air filter housing and air filter assembly provides for easy, secure, and removable connection to a suspended ceiling or forced-air opening frame while providing easy access to the filter media for replacement. The inventive air filter housing and installed air filter media provide high visibility of the air filter media through the housing air passage opening which is unobstructed by the housing itself providing comfort and peace of mind for building occupants as well as easy visibility of substantially all of the air filter media from within the working space to indicate when an air filter cartridge needs to be replaced. The inventive air filter housing is also very economical to manufacture, and easy to use and maintain in the field by building occupants without particular HVAC experience or a need for tools.

These and other aspects of the present disclosure are disclosed in the following detailed description of the embodiments, the appended claims, and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Referring to FIGS. 1-20, examples of an air filter housing, an air filter assembly, and methods of assembly and installation are shown. The exemplary air filter housing, air filter assembly, and methods of assembly and installation are useful for a wide variety of applications where a forced-air HVAC system or device is used to circulate air into, or from, a working or living space, for example the interior of a commercial office building or structure, as well as residential structures. Examples of the invention may also be used on forced air devices, for example stand-alone electric air circulation fans, for example square or box-shaped circulation fans, used to circulate air into or around the interior of commercial or residential spaces. A particularly useful, but not exclusive, application of the invention is in the interior of a commercial office building or structure that includes a suspended ceiling supported by a metallic or ferrous material grid structure and exhaust vents common in most office buildings. There are numerous additional applications where an air filter is desired to increase the air quality in a working or living space known by those skilled in the art.

Figure 1:
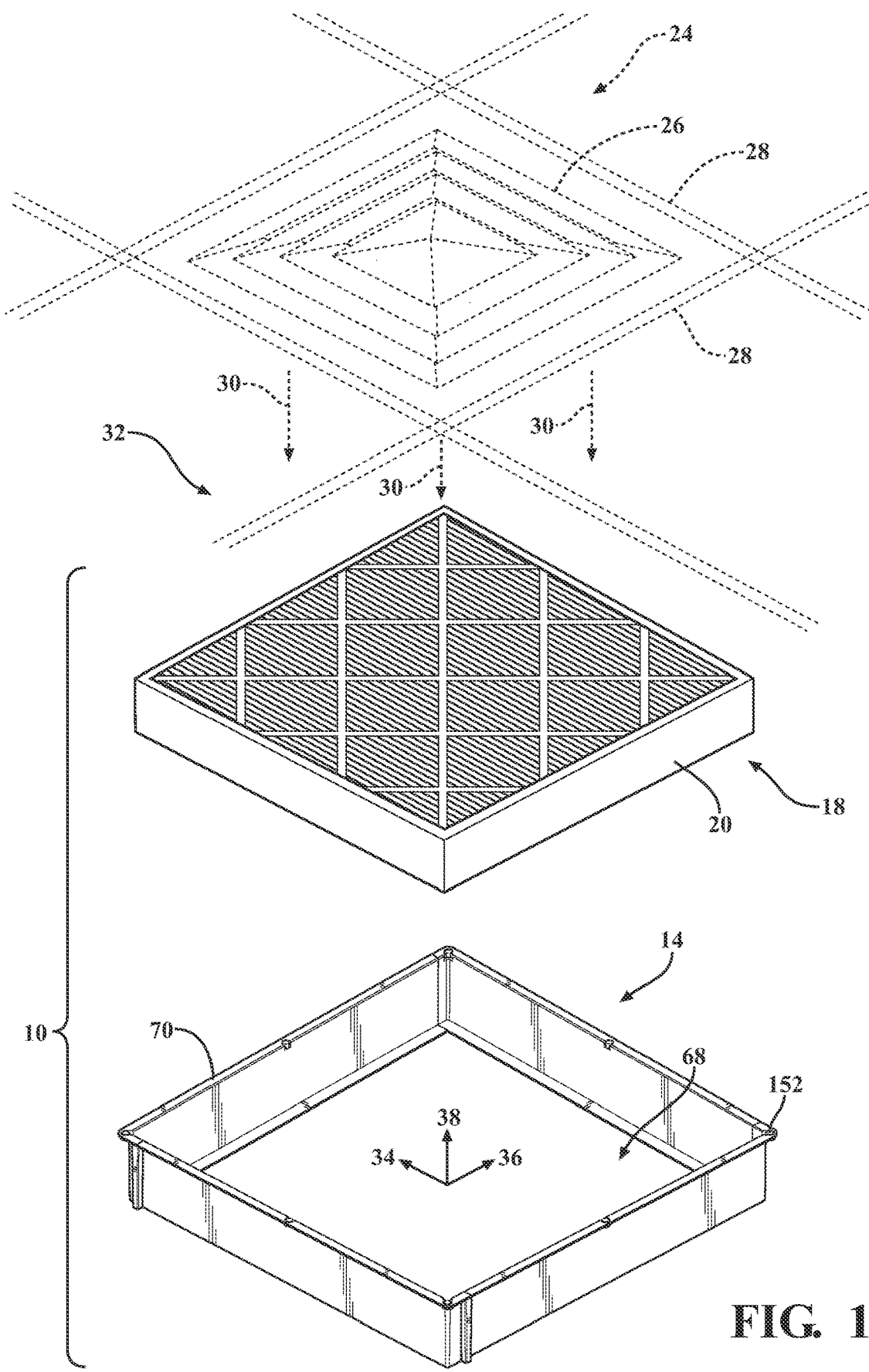
FIG. 1 is an exploded perspective view of one example of an air filter assembly including an air filter housing and air filter media cartridge in an exemplary application with a suspended ceiling HVAC exhaust vent.

Referring to FIG. 1 an example of the inventive air filter assembly 10 is shown. The air filter assembly 10 includes a multi-piece air filter housing 14 (shown assembled) and an insertable air filter media 18 (shown in the exemplary form of a commercially-available air filter cartridge 20). In the form of an air filter assembly 10, the exemplary housing 14 with inserted filter media 18 are removably connected to a suspended ceiling 24 (shown in dashed line in FIG. 1) circumferentially around a forced-air passage opening 26 as further discussed below.

Exemplary application suspended ceiling 24 includes a plurality of forced-air passage through openings 26 (one shown) defined by an air passage frame or support grid 28 which generally defines or surrounds the forced-air passage opening 26. In one example, the frame 28 is a support frame or grid commonly used to support suspended ceiling tiles or panels, and is made from a ferrous metal material, or a ferrous or iron-infused material, which is engageable by permanent magnets. The air passage openings 26 are in communication with a HVAC forced air circulation system operable to forcibly generate an air flow 30 into a working or living space 32. In the example suspended ceiling 24 application shown, the air passage openings 26 extend in a coordinate horizontal X-direction 34 and Y-direction 36, and the air flow 30 generally passes through the air passage opening 26 along a vertical Z-direction 38 (e.g., downward into the working space 32 for an exhaust vent or upward toward the air passage opening 26 for an air return or intake vent). It is understood that frame 28 may be on structures other than suspended ceilings, for example the square frame of an electric box-type circulation fan, the frame of an exhaust vent of a portable air conditioner, and other forced air devices known by those skilled in the art.

It is understood that the described suspended ceiling 24 air passage through openings 26, and frame 28 may take different sizes, constructions, configurations, geometries, and orientations as known by those skilled in the art. It is also understood that although air flow 30 is shown in one application as flowing through the air passage opening 26 downward into the working space 32, air flow 30 may also act to in the opposite or upward Z-direction 38 (not shown), for example as a cold air return removing air from the working space 32. It is further understood that coordinate directions X 34, Y 36 and Z 38 can take other orientations, for example where air filter assembly 10 and housing 14 are connected to an air passage opening 26 positioned through a vertically-oriented wall or other angled surface (not shown).

Figure 2:
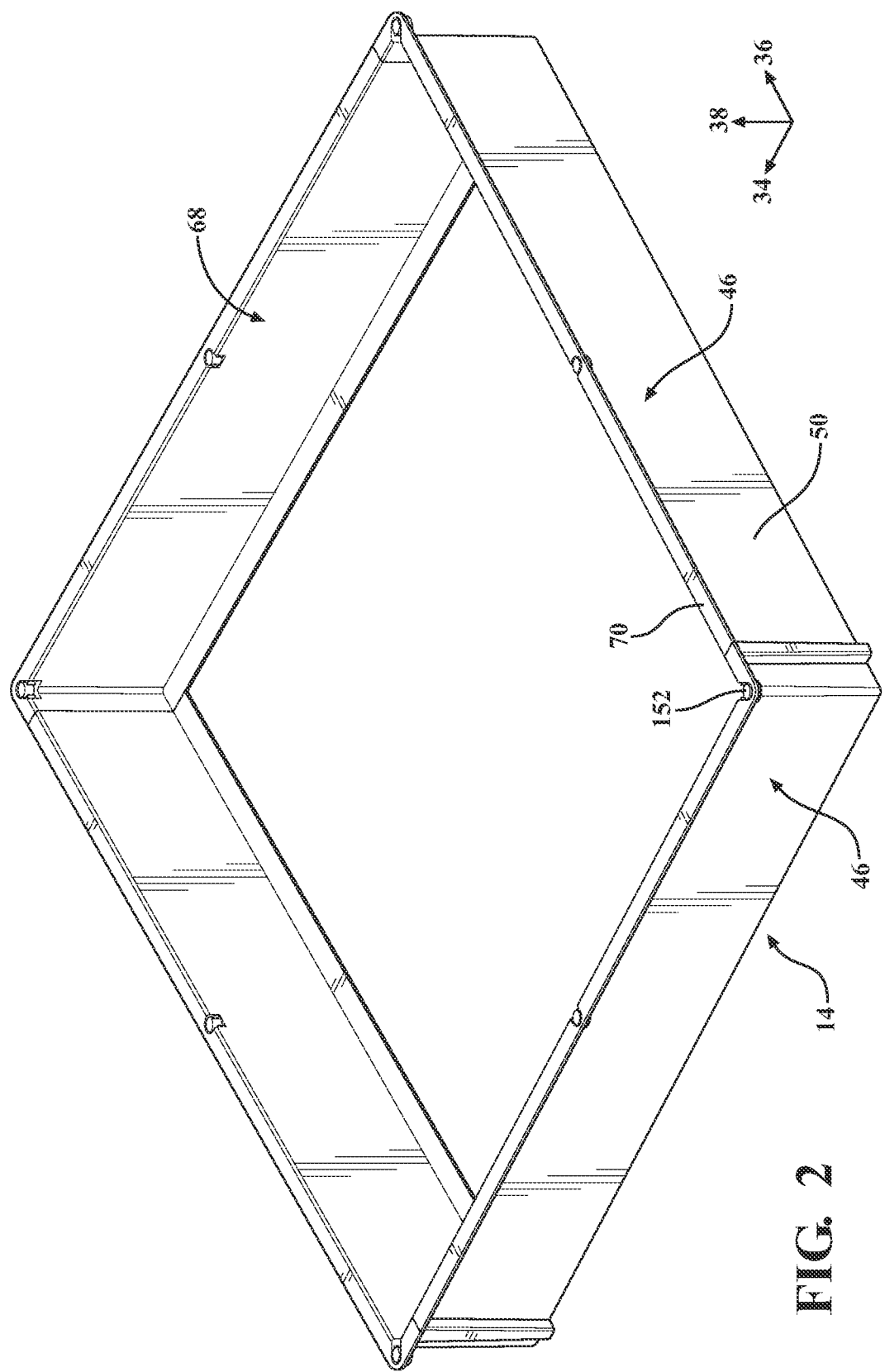
FIG. 2 is a top perspective view of the air filter housing shown in FIG. 1.
Figure 3:
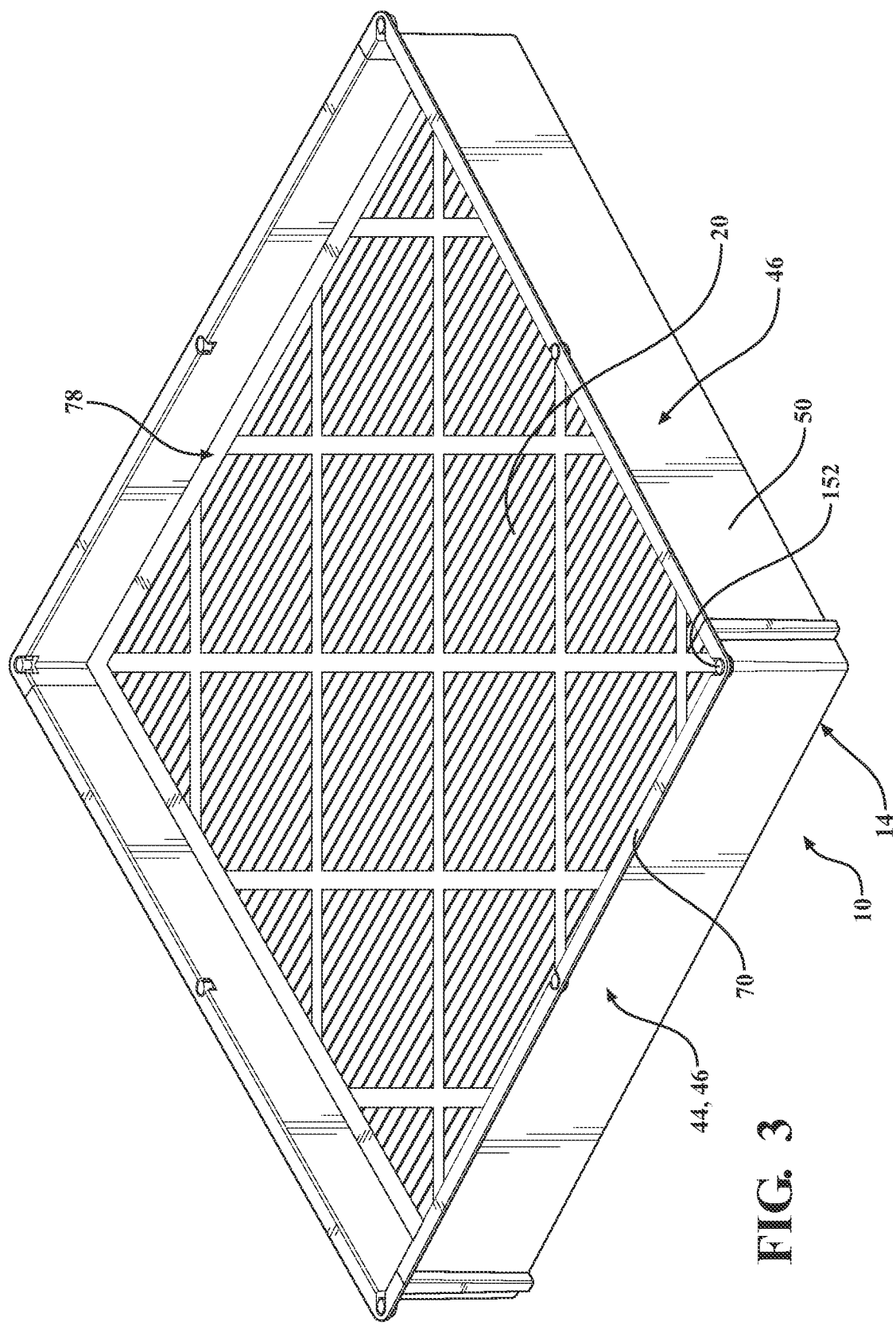
FIG. 3 is a top perspective view of the air filter housing in FIG. 2 shown with an installed exemplary air filter media cartridge.
Figure 4:
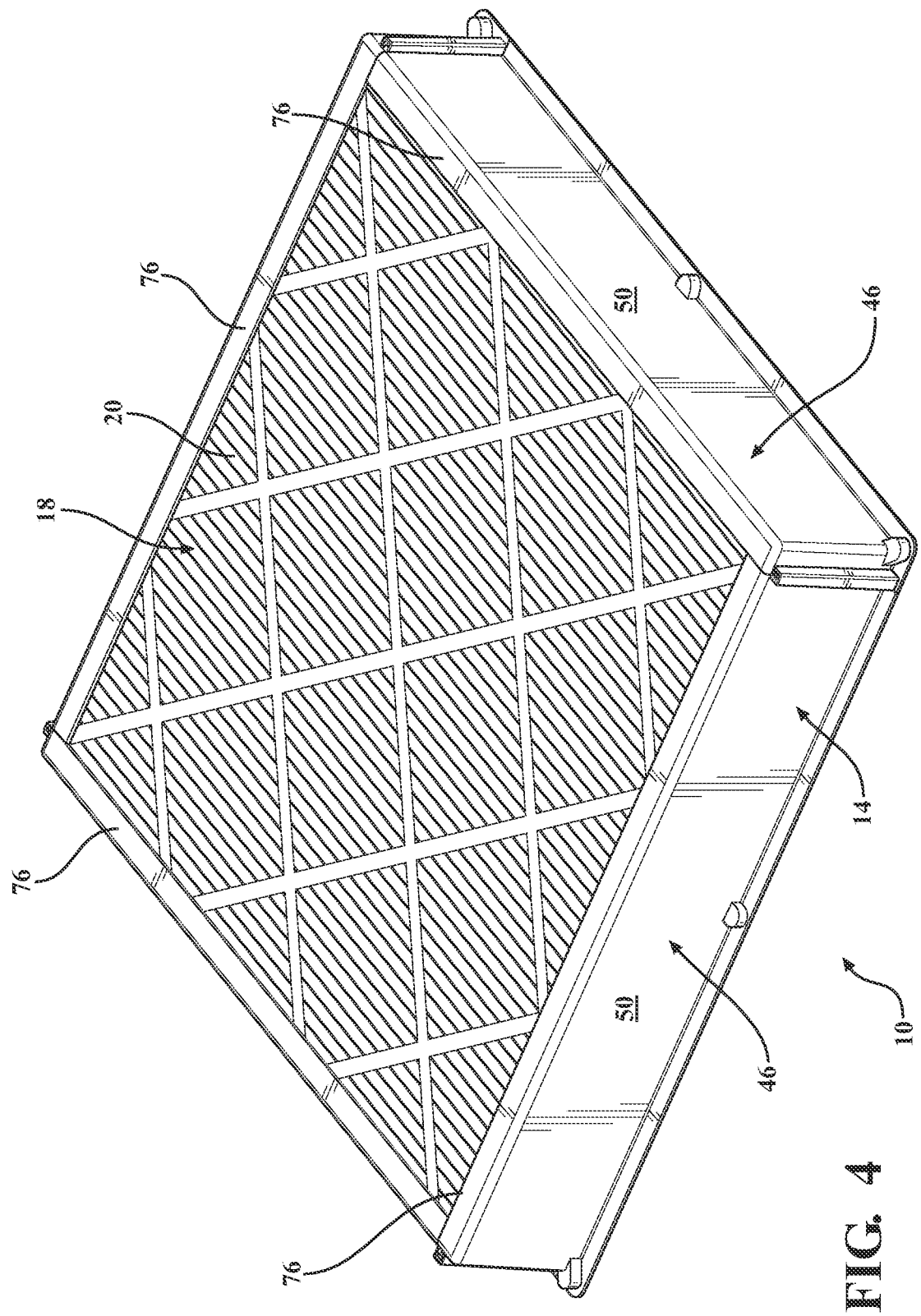
FIG. 4 is a bottom perspective view of the air filter housing of FIG. 3.

Referring to FIG. 2, an example of the inventive multi-piece air filter housing 14 is shown assembled without a filter media 18 installed. As assembled, the housing 14 is operable to receive and support a filter media 18, for example an air filter cartridge 20, and be connected to an air passage opening frame 28 (FIG. 1) for filtering air produced by a forced air source, for example a HVAC system shown in FIG. 1, an electric circulation fan, or other forced air source device. Referring to FIGS. 3 and 4, the assembled air filter housing 14 is shown with a filter media 18 in the form of installed filter cartridge 20 forms the air filter assembly 10.

Figure 5:
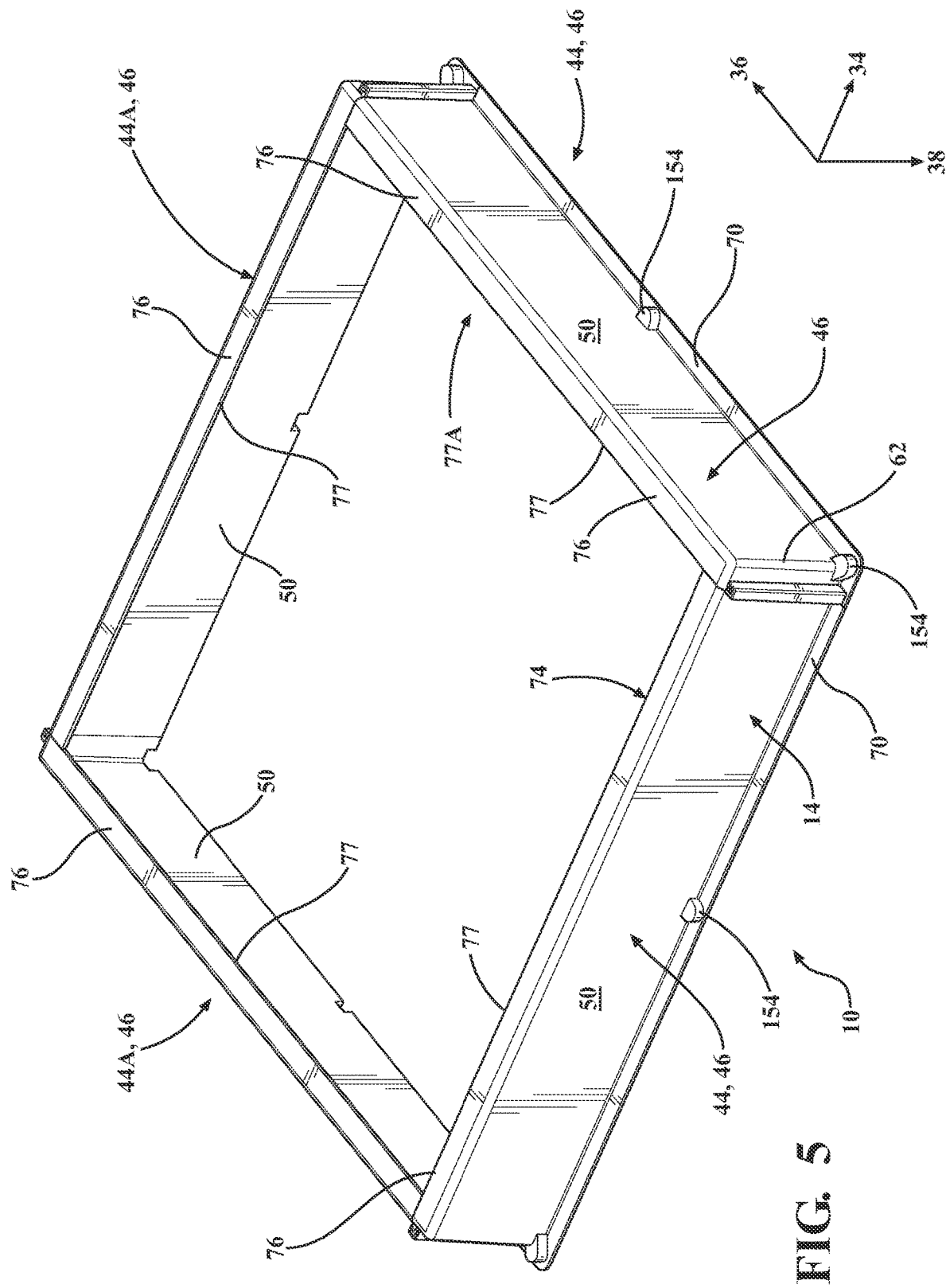
FIG. 5 is a bottom perspective view of the air filter housing shown in FIG. 2.
Figure 6:
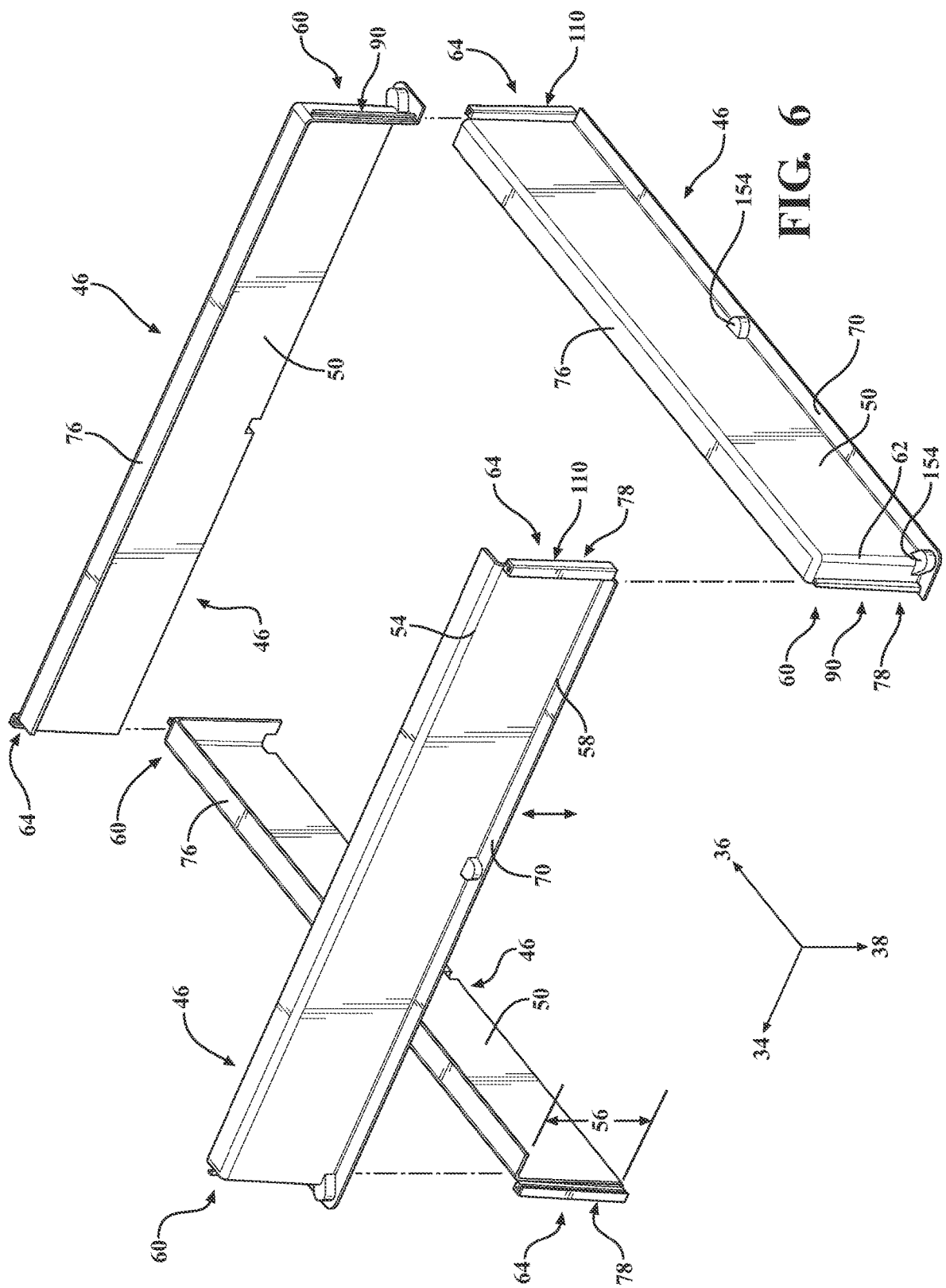
FIG. 6 is an exploded perspective view of the air filter housing shown in FIG. 5 showing two of the sidewall sections disassembled from the remaining two sidewall sections.

Referring to FIGS. 2 and 5-8, an exemplary multi-piece air filter housing 14 is shown in an assembled state (FIGS. 2 and 5) and a disassembled state (FIG. 6). It is noted that in FIGS. 5-8, the upper end of the housing 14 (for example toward upper flange 70) which receives the filter media 18, which is normally oriented to face upward when in use (as shown in FIG. 1) is illustrated positioned or facing downward. As best seen in FIG. 5, housing 14 includes a multi-piece design (four pieces shown) which includes at least a first sidewall section 44 (two shown) and a second sidewall section 44A (two shown).

Figure 18A:
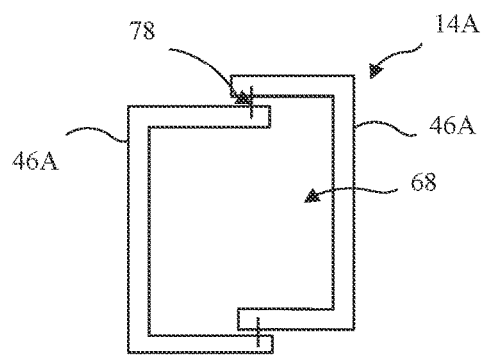
FIGS. 18A-18E are schematic, alternate example configurations of an air filter housing and sidewall sections.
Figure 18B:
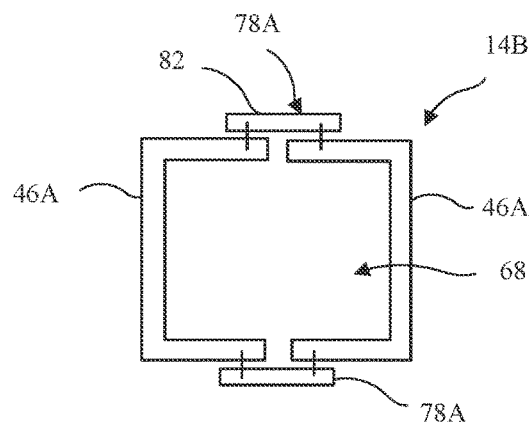
Figure 18C:
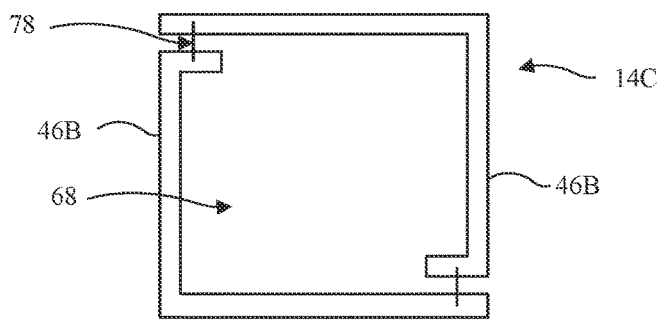

In one example of housing 14, the housing 14 includes only two sidewall sections 44 and 44A. In this example, each of the first sidewall section 44 and the second sidewall section 44A include two integral portions or pieces, for example each portion forming a 90 degree angle. In the two-piece example, the first sidewall section 44 is a single, integral piece or sidewall section (i.e., the two adjacent sidewall sections 46 (the two 44 pieces) forming a 90 degree angle are molded as a single, integral piece 44), and the second sidewall section 44A is a single, integral piece or sidewall section (i.e., two adjacent sidewall sections 46 molded or formed as a single, integral piece 44A forming a 90 degree angle as described for first sidewall section 44). In other words, in the example housing 14 having at least a first sidewall section 44 and a second sidewall section 44A, the multi-piece housing 14 includes a total of two sidewall sections (44 and 44A) which are connected together as further described below to form the housing 14 defining an interior cavity 68 for receipt and support of the filter media 18. Alternate examples of a housing 14 including only two sidewall sections 46 are shown in FIGS. 18A, 18B, and 18C.

In a particularly useful, but not exclusive, example of air filter housing 14 shown in FIGS. 1-8, air filter housing 14 includes four separate, modular sidewall sections 46 each having the same construction or configuration as further discussed and illustrated below (i.e., housing 14 includes four separate and independent sidewall sections 46 which are connected together to form housing 14 and define the interior cavity 68 to receive and support the filter media 18). For purposes of simplicity alone, housing 14 will be described and illustrated in the example of four modular sidewall sections 46, although it is understood that housing 14 can alternately be a two-piece design including a first sidewall section and a second sidewall section, for example shown in FIGS. 18A-18C.

Figure 7:
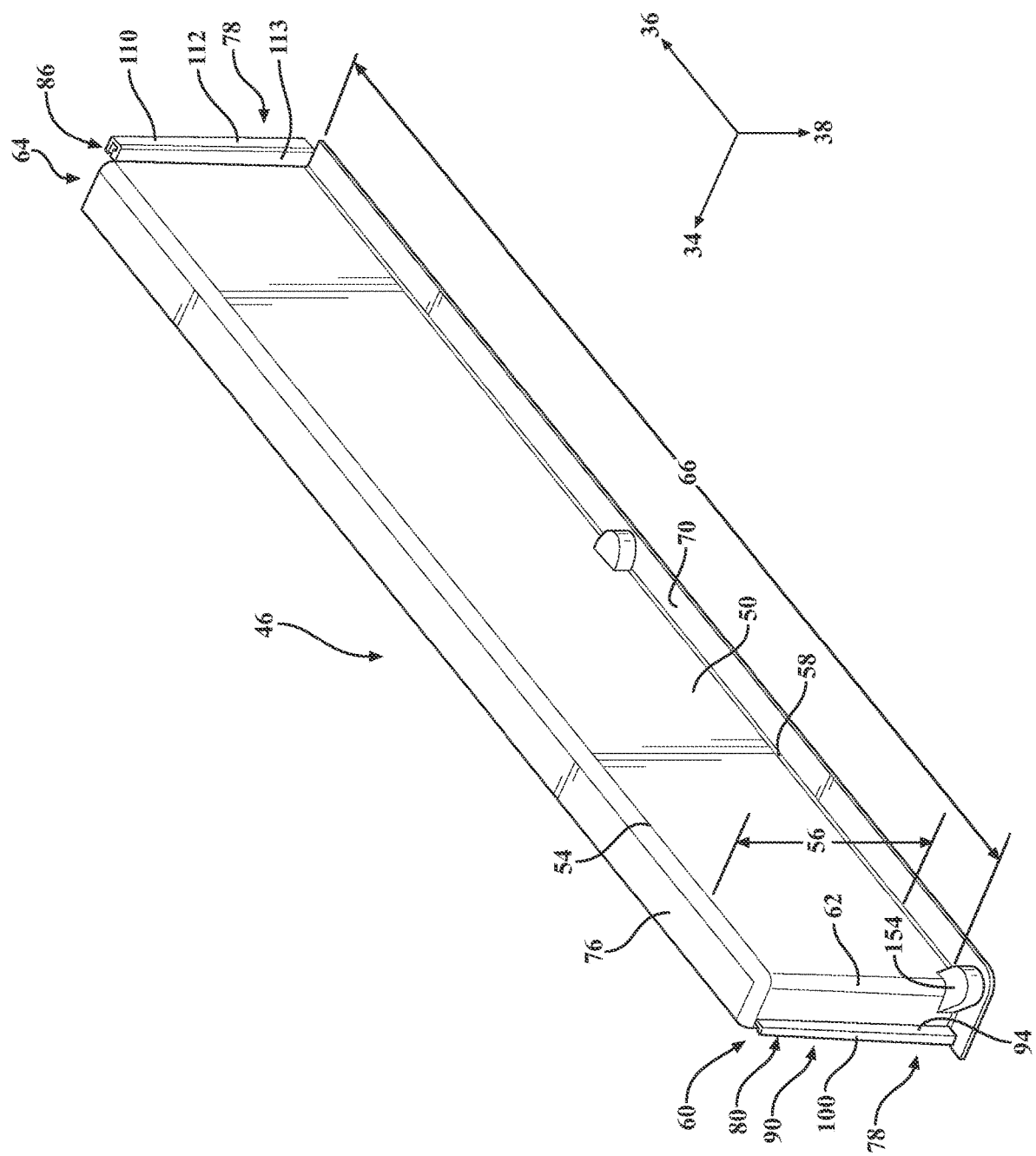
FIG. 7 is a bottom outer perspective view of an example of the air filter housing sidewall section shown in FIG. 5.
Figure 8:
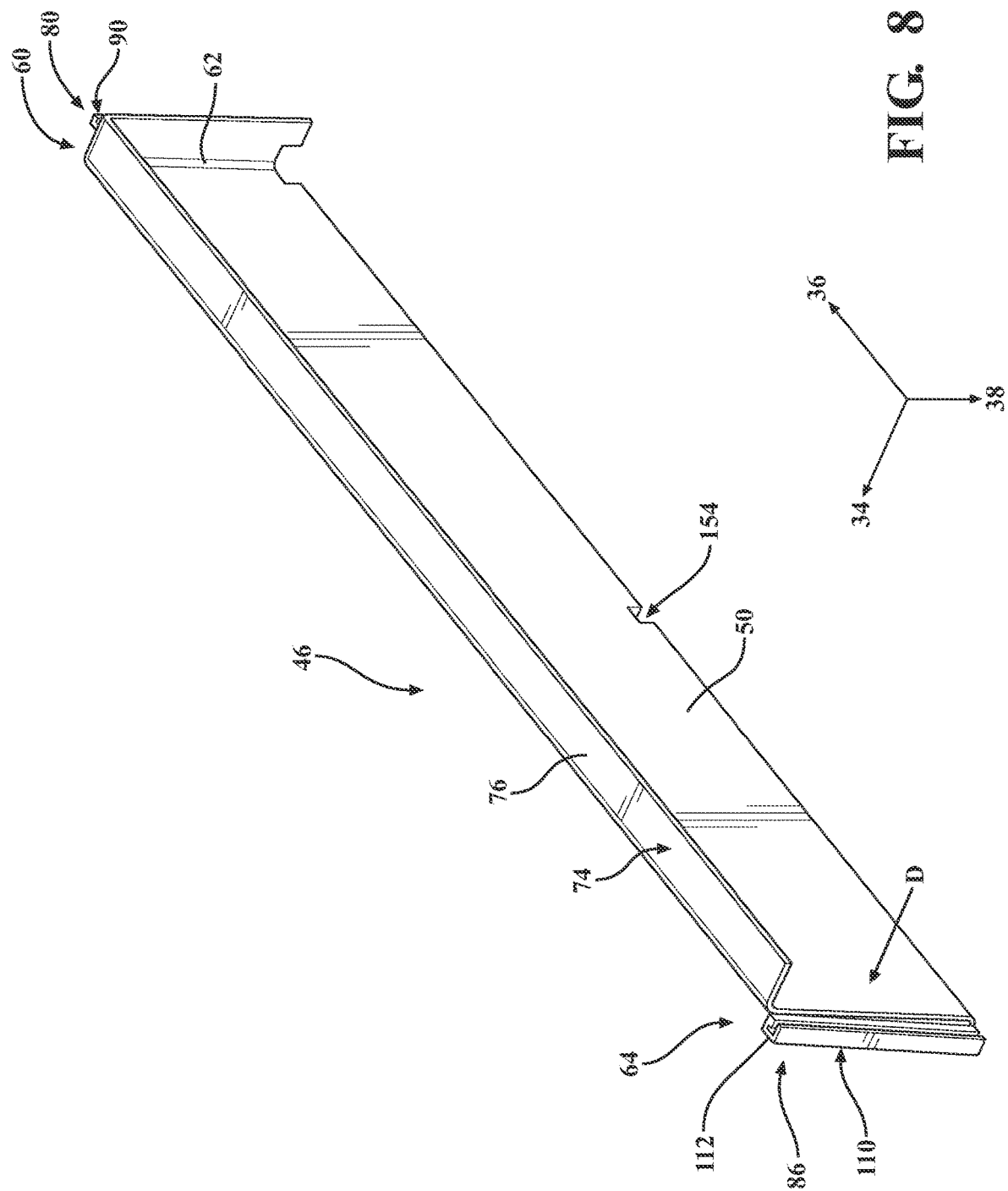
FIG. 8 is a bottom inner perspective view of the air filter housing sidewall section shown in FIG. 7.
Figure 9:
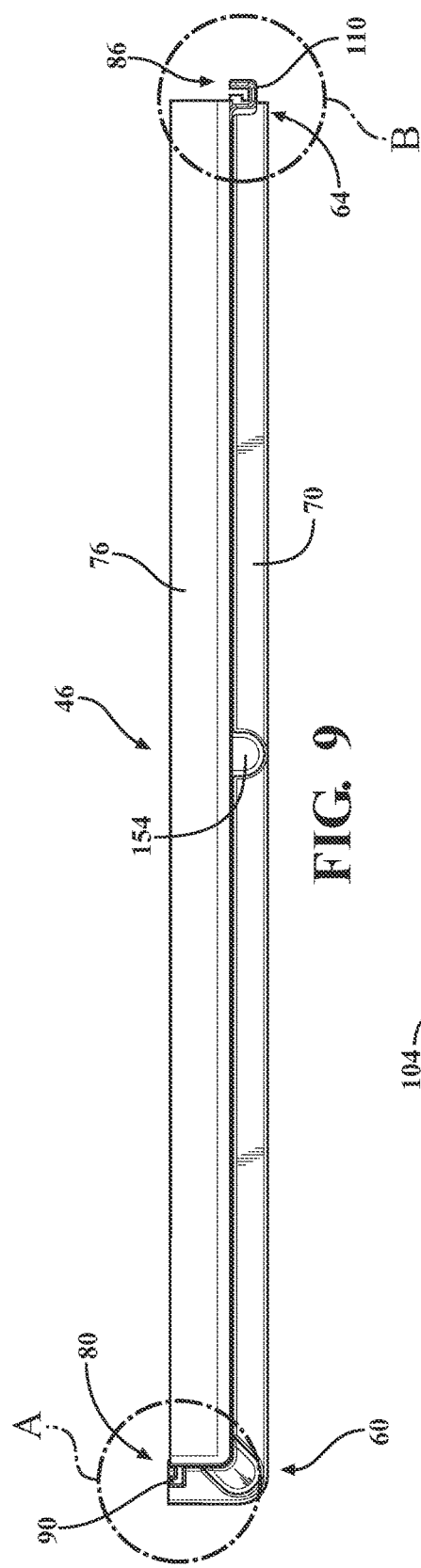
FIG. 9 is a top view of the inverted sidewall section shown in FIG. 7.

Referring to FIGS. 6-8, in the exemplary common suspended ceiling 24 application having a square-shaped air passage opening 26 and/or frame 28 shown in FIG. 1, exemplary housing 14 includes four modular sidewall sections 46 manufactured to be identical, or substantially the same (structural features and dimensions in the X 34, Y 36 and Z 38 directions), including integral sidewall connectors discussed further below. In this example where the four sidewall sections 46 are the constructed or configured the same, the sidewall sections 46 are deemed to be modular in construction (i.e., each sidewall section 46 may be used in any of the four positions of the sidewalls 46 shown in FIGS. 1 and 5-8 to define the interior cavity 68 to receive the filter media 18). Although examples of the air filter housing 14 are alternately described and illustrated as including two sidewall sections (two-piece design), or four sidewall sections 46 (best seen in FIG. 6), it is understood that a fewer number, or greater number, of sidewall sections 46 may be used to suit the particular application.

In alternate examples (not shown), it is further understood that the individual sidewall sections 46 used to form housing 14 may not be modular (i.e., the sidewall sections 46 used to form housing 14 may include one or more alternately constructed sidewall sections 46 having different constructions, dimensions, features and/or orientations from other sidewall sections 46) to suit the particular application and performance specifications as known by those skilled in the art. In one example (not shown), where the forced air passage opening 26 or frame 28 is rectangular in dimensions, two of the four sidewall sections 46 will have a longer length than the two adjacent sidewall sections 46.

Referring to the multi-piece housing 14 example including four modular sidewall sections 46 in FIGS. 6-8, as best seen in FIG. 7, exemplary sidewall section 46 includes a sidewall 50 having a lower end 54, and an upper end 58 defining a sidewall height 56. As best seen in FIGS. 7 and 10A, sidewall 50 further includes a first end 60 having a corner portion 62, and a second end 64 separated or positioned distant in the X 34 or Y 36 direction from the first end 60, defining a sidewall length 66. In one example, the sidewall length 66, or alternately the length of the entire sidewall section 46, is longer than the respective length or dimension of the air passage opening 26 (FIG. 1) such that the connected sidewall sections 46 extend beyond, and circumferentially surround, a perimeter of the air passage opening 26 (e.g., the inner perimeter edge of the frame 28 defining the opening 26). In the example of the air passage opening 26 being an HVAC exhaust vent (FIG. 1), this results in the housing 14, and filter assembly 10, capturing and/or maximizing the amount of forced-air, and the direction of the airflow 30, through the interior cavity 68 of the housing 14 and the filter media 18, for example filter cartridge 20.

In one example, the sidewall section 44, 44A, 46 is made of a polymer material, for example polyethylene, which may be molded and formed by common manufacturing processes, for example injection molding or vacuum forming, into a thin cross-section having good rigidity, stiffness, resilience, and impact resistance. Other polymers, elastomers, or composites, as well as light weight ferrous and non-ferrous metals, may be used to suit the particular application and performance requirements.

As best seen in FIG. 1, on connection of the sidewall sections 46, the interior surfaces of the respective sidewalls 50 define an interior cavity 68 for receipt of the filter media 18 as further described below. In one example, the height 56 of the sidewall 50 is about four (4) inches in length to accommodate use with a common filter media cartridge 20 having a height or depth of 4 inches. The example sidewall height 56 of about 4 inches would alternately accommodate a common filter media cartridge 20 having a height or depth of two (2) inches. In an alternate example, the height 56 of the sidewall 50 is about 2 inches, for example to accommodate a common air filter cartridge 20 height or thickness of about 2 inches. Alternate sidewall heights 56 may be used, longer or shorter in length, to accommodate a wide variety of commercially available, high quality air filter media 18 heights, for example filter cartridges 20, and/or to suit the particular application, for example desired air quality, or working space 32 environment. In an alternate example, in a suspended ceiling 24 application having a vent or louvered structure positioned in the opening 26 (FIG. 1), the sidewall height 56 may be longer than 4 inches (or alternately 2 inches) to accommodate the desired thickness of the filter cartridge 20 as well as the depth or height of the vent structure inside the internal cavity 68 allowing the housing to connect flush with the frame 28 as further described below.

In one example, the length 66 of sidewall 50 is about 24 inches in length to accommodate a common size of 24 inches square for the air passage openings 26 used for commercial suspended ceilings 24. It is understood that alternate dimensions for sidewall 50 length 66, both larger or smaller (for example 48 inches or 12 inches), may be used to suit the particular application, environment, and/or performance requirements as understood by those skilled in the field.

Figure 12:
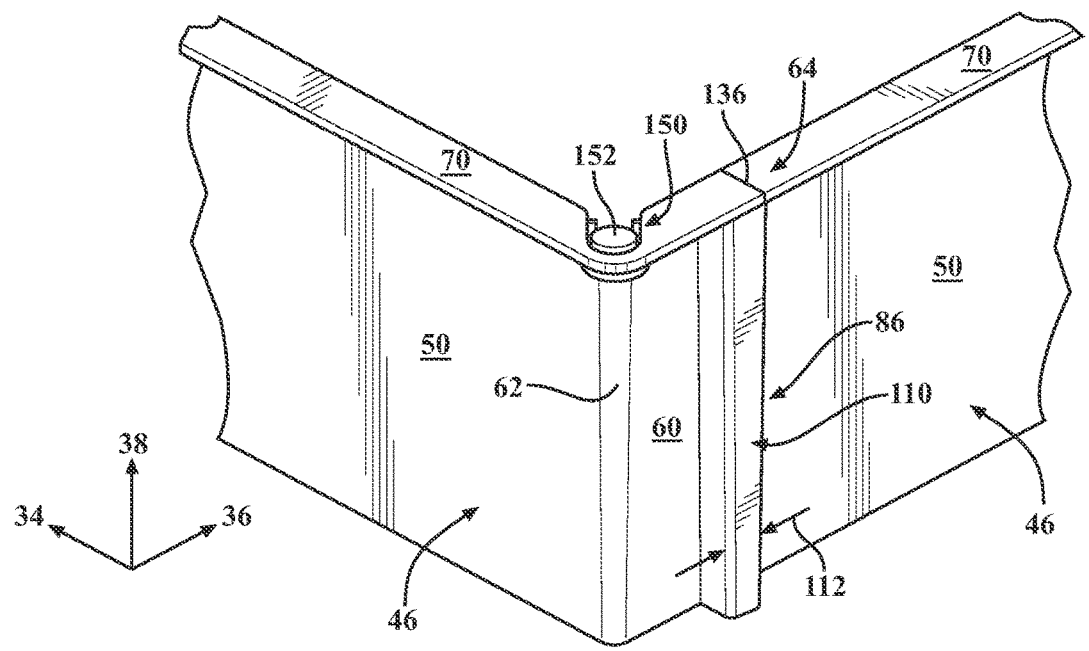
FIG. 12 is an enlarged perspective view of a portion of FIG. 2.
Figure 13:
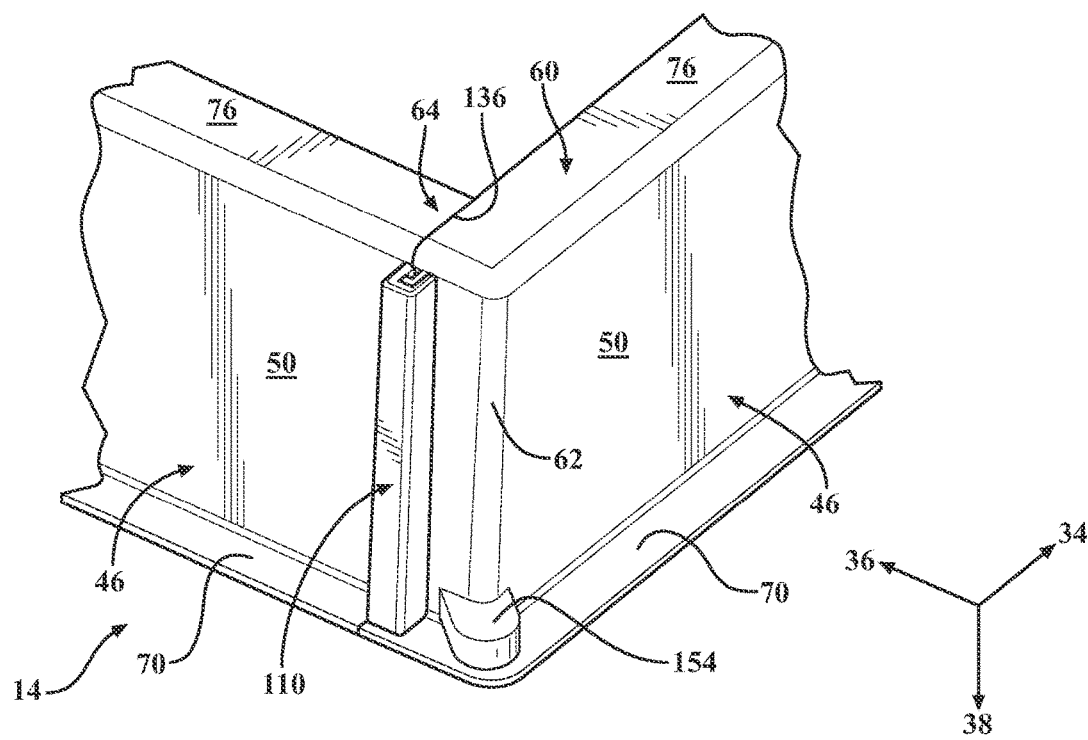
FIG. 13 is a bottom perspective view of a portion of FIG. 12.

As best seen in the FIGS. 2, 3 and 12 example, sidewall section 46 includes an upper flange 70 connected to the upper end 58 of the sidewall 50, and extends outwardly from the sidewall 50 and corner portion 62 along the X 34 or Y 36 directions as generally shown. In one example, upper flange 70 is substantially horizontally oriented and extends continuously along the upper end 58 of sidewall 50 and corner portion 62. In one example, a length of the flange 70 (or horizontal portion thereof), is sized to be the same as, or slightly smaller, than a width of the frame 28 so the entire length of the flange 70 contacts or sits flush with the frame 28 between suspended ceiling panels supported by the frame 28. It is understood that the upper flange 70 may take other sizes, dimensions, constructions, configurations, and/or orientations to suit the particular application. In alternate examples, the upper flange 70 may be directed inward toward internal cavity 68, may not be continuous, or may not be included at all, to suit the particular application or environment as known by those skilled in the art.

In one example of housing 14 (not shown), a seal is connected to an upper surface 162 (FIG. 17) of the upper flange 70. The seal is operable to decrease or eliminate air flow 30 from passing between the frame 28 and the upper surface 162 of the upper flange 70. In one example, the seal may be an adhesive-backed foam or elastomer material. Other seal devices, constructions, configurations, or materials may be used as known by those skilled in the art.

Exemplary air filter housing 14 further includes a filter media stop 74 that extends inward in the X 34 or Y 36 directions into the interior cavity 68. The filter media stop 74 is operable to abuttingly or frictionally engage and provide a support surface for filter media 18, for example filter cartridge 20, in the housing 14 (i.e., to support and prevent the filter media 18 from passing or falling through the housing 14 along the Z-direction 38).

As best seen in the FIGS. 6-8 example, one example of the filter media stop 74 is in the form of a lower flange 76 connected to, or positioned adjacent or in proximity to, the sidewall 50 lower end 54 as generally shown. The lower flange 76 extends inward toward the interior cavity 68 in the X 34 or Y 26 direction. In one example, lower flange 76 is integrally formed in the sidewall 50, is oriented horizontally, or substantially horizontal (e.g., orthogonal to the sidewall 50), and extends continuously along the lower end 58 of sidewall 50.

In the example best seen in FIG. 5, the lower flange 76 includes a distal end 77 positioned inward from the lower end 54 of the sidewall 50. On connection of the sidewall sections 46 as shown in FIG. 5, the distal ends 77 form a housing air passage opening 77A. As best seen in the FIG. 5 example, the assembled air filter housing 14 housing air passage opening 77A is unobstructed by the housing 14 (i.e., there are no cross-bars, vent grids, louvers, ribs, or other structures extending between the connected sidewall sections 46, sidewalls 50, the distal ends 77, or lower flanges 76, and/or spanning across or through the housing air passage opening 77A. As best seen in FIG. 4, this unobstructed or clear housing air passage opening 77A is advantageous in that substantially all of the filter media 18 lower surface facing the working space 32 (FIG. 1) is easily visibly seen by working space 32 occupants who can readily see and/or inspect whether the air filter media is dirty and needs to be replaced. This is comforting and reassuring to working space 32 occupants that the air filter media 18 is in good or fresh working condition assuring the occupants of high or clean air quality.

Conventional air filter devices common use of grids, louvers, or other functional or aesthetic structures positioned in front of the filter media obstruct the view of the filter media which is often neglected, forgotten about, and not replaced for months or years compromising the effectiveness of the filter media and reducing air quality. The conventional devices' use of grids or louvers also promotes the collection of dust, dirt and other particulates on the grids which can harbor germs, viruses, organisms, and other potentially hazardous substances which reduce air quality and are potentially harmful to working space 32 occupants. The conventional device use of grids or louvers further reduces the amount of air flow through the housing air passage opening 77A, thereby reducing air circulation in the working space 32.

In one alternate example (not shown), the lower flange 76 may include one or more separate flanges discontinuously spaced from one another along sidewall 50. In one alternate example (not shown), each sidewall section 46 may include a single lower flange 76 extending along only a portion of the length 66 of sidewall 50, for example positioned midway between the first end 60 and the second end 64 of the sidewall 50. In an alternate example where the sidewall sections 46 are not all configured the same (e.g., two sidewall sections 46 are longer than the other two sidewall sections 46), only two of the four sidewall sections may include a filter media stop 74 or lower flange 76. It is understood that the filter media stop 74, and the example lower flange 76, may take other dimensions, sizes, constructions, configurations, number of flanges, or orientations, to suit the particular application and performance specifications as known by those skilled in the art.

As best seen in the FIGS. 1 and 4 example, on connection of the sidewall sections 46 to form housing 14 defining interior cavity 68, the filter media 18, for example filter cartridge 20, is axially inserted or installed in the interior cavity 68 in abutting engagement with the lower flange 76. The lower flange 76 provides a supporting surface for the filter media 18 in the housing 14. In one example generally described above, the sidewall sections 46 are sized or dimensioned such that the respective sidewalls 50 are positioned in close proximity to the exterior dimensions of the filter media 18, for example the outer surfaces of the filter cartridge 20, to minimize or prevent air flow 30 from passing between the sidewalls 50 and the filter cartridge 20 thereby avoiding passing through the filter cartridge 20 (i.e., the filtering media of the cartridge). In one example (not shown), a seal may be provided on the inside surface of the sidewalls 50 to contact or abuttingly engage the exterior side surfaces of the filter cartridge 20 positioned in the interior cavity 68 to further minimize or prevent air flow 30 from passing between the sidewalls 50 and the exterior sides of the filter media 18.

In an alternate example (not shown) filter media stop 74 may include one structure, or a plurality of alternate structures, connected to the inside surface of the sidewalls 50, to serve as a support surface or stop to support the filter media 18 when positioned in the internal cavity 68 of the housing 14. In one example, the filter media stop 74 may include a single, or multiple, integrally formed protrusions, barbs and/or structural formations extending inward into the internal cavity 68 from the inside surface of two or more of the sidewalls 50. In one example, triangular-shaped barbs or formations are integrally molded into the inside surface of sidewall 50 and extend inwardly into the interior cavity 68 to engage the filter cartridge 20 on installation into housing 14 and prevent movement of the filter cartridge 20 relative to the housing 14 while in use. The example triangular formations provide a flat surface for the filter cartridge 20 to engage and support the filter cartridge 20.

In one alternate example, a flange or extension similar to lower flange 76 may be positioned above the sidewall lower end 54, between the upper end 58 and the lower end 54. The alternate example filter media stop 74 may be integrally molded into the sidewall 50. The location and/or position of the filter media stop 74 along the height 56 of the sidewall 50 may be determined by the anticipated thickness or height (in the Z-direction 38) of the filter media 18 so that the entire height of the filter media 18 is positioned below the upper end 58 of the sidewall 50 or the upper flange 70 (as shown in FIG. 3). Additional space between the top surface of the filter media 18 and the upper end 58 may be included to leave adequate space for a HVAC vent (FIG. 1), for example.

Still referring to the FIGS. 6-8 example, air filter housing 14, and more particularly at least first sidewall section 44 and second sidewall section 44A, each further include a sidewall connector 78 operable to connect the sidewall 50 first end 60 to an adjacent sidewall 50 second end 64, and the sidewall 50 second end 64 to an adjacent sidewall 50 first end 60, to form the air filter housing 14 defining the interior cavity 68 operable to receive filter media 18 as generally described above. In one example as best seen in FIGS. 7 and 9-11, the sidewall connector 78 includes a first sidewall connector 80 positioned at the sidewall 50 first end 60 and a complimentary second sidewall connector 86 positioned at the sidewall 50 second end 64 as generally shown. In one example, the first sidewall connector 80 and the second sidewall connector 86 are integral to the sidewall 50 (e.g., integrally formed or molded in a single piece or component).

Figure 10:
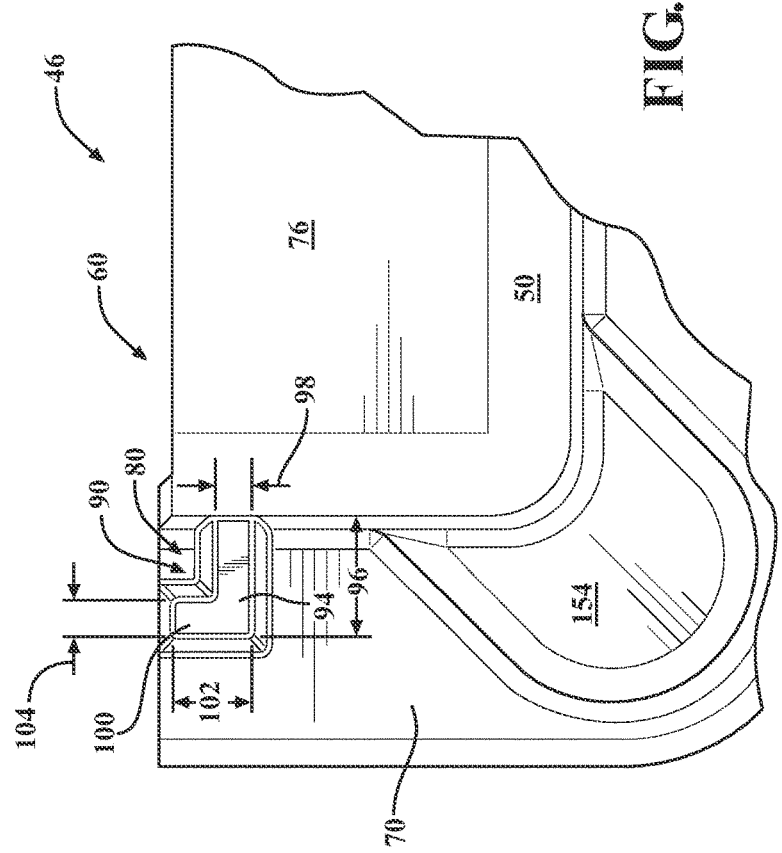
FIG. 10 is an enlarged view of a portion of FIG. 9 identified as "A."
Figure 10B:
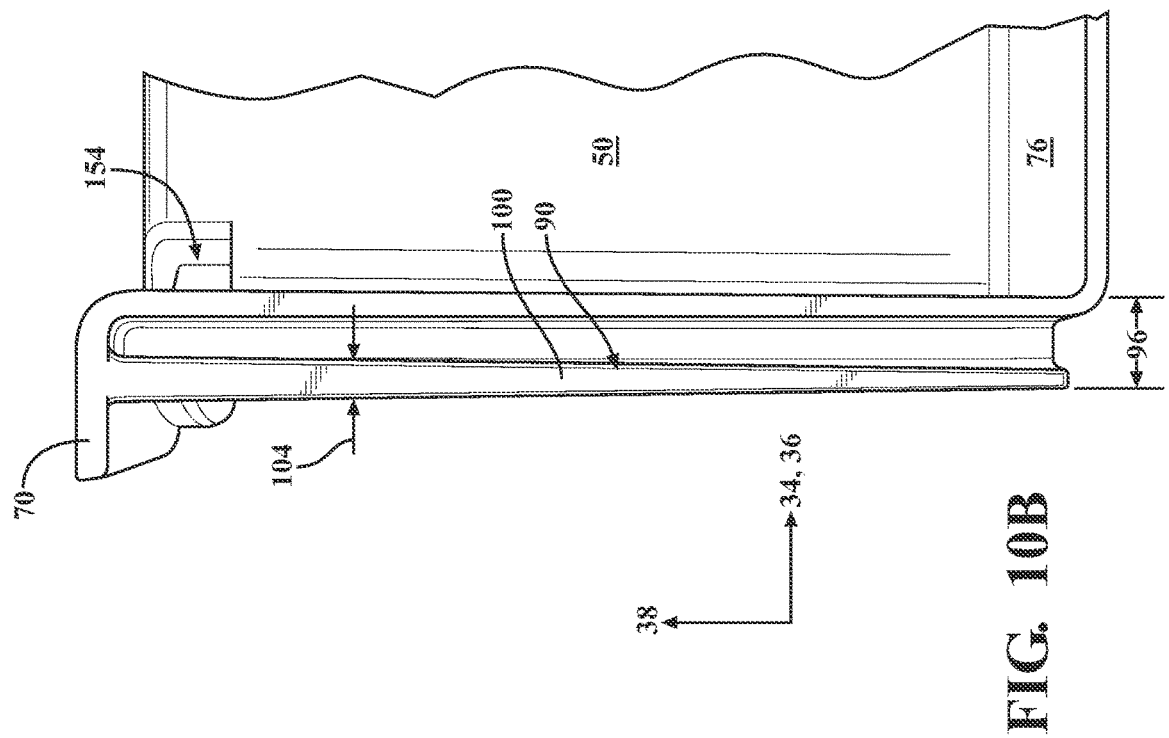
FIG. 10B is a rear view taken in the direction of C of the sidewall section in FIG. 10A.
Figure 10A:
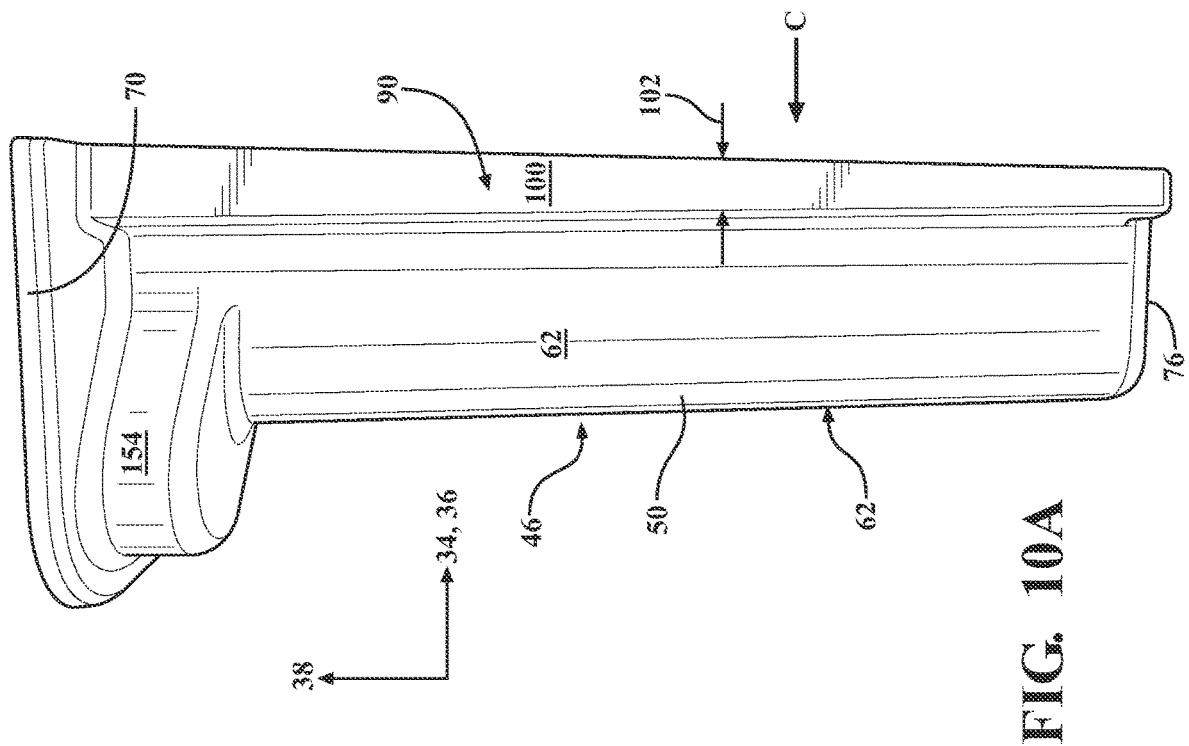
FIG. 10A is a rotated left end view of the sidewall section in FIG. 7.

As best seen in the FIGS. 7, 9-10, 10A, and 10B example, first sidewall connector 80 includes an elongate angled tab 90 which extends in the Z direction 38 as shown. In one example, angled tab 90 is an integral part of the sidewall 50 (i.e., formed as a single piece or component). As best seen in the FIGS. 10, 10A and 10B example, angled tab 90 includes a first portion 94 having a length 96 extending generally aligned or parallel to sidewall 50, and having a width 98. Angled tab 90 includes a second portion 100 connected to the first portion 94 having a length 102 extending substantially transversely (orthogonally 90 degrees) from the first portion 94 as generally shown, and including a width 104. As best seen in FIGS. 7, 10A, and 10B, angled tab 90 extends substantially the entire height 56 of the sidewall 50.

As best seen for the angled tab 90 in the example in FIGS. 7, 10, and 10B, the length 96 and the width 98 of the first portion 94 remain substantially constant in dimension as the angled tab 90 extends in the Z direction 38 from the lower end 54 of the sidewall 50 (e.g., adjacent to the lower flange 76) toward the upper end 58 of the sidewall 50 (e.g., adjacent the upper flange 70). In one example, the length 102 and the width 104 of the angled tab second portion 100 also increase as the angled tab 90 extends in the Z direction 38 from the lower end 54 of the sidewall 50 toward the upper end 58 of the sidewall 50. Although described as the first portion 94 length 96 and width 98 dimensions remain substantially constant from the lower end 54 toward to upper end 58, and the second portion length 102 and the width 104 increase in dimension as the angled tab 90 extends in the Z direction 38 from the lower end 54 toward the upper end 58 of the sidewall 50, it is understood that each of the first portion length 96 and/or width 98, and each of the second portion length 102 and/or width 104, may vary in dimension other than as described. In other words, each of these lengths or widths may remain substantially constant, may increase, or may decrease along the angled tab 90 between the lower end 54 and the upper end 58 to suit the particular application and performance requirements.

As best seen in the FIGS. 7-9, 11, 11A, and 12 example, exemplary second sidewall connector 86 includes an elongate angled channel 110 which extends in the Z direction 38 as generally shown. In one example, angled channel 110 is an integral part of the sidewall 50 (i.e., formed as a single piece or component). As best seen in FIGS. 7, 11, 11A and 12, exemplary angled channel 110 includes a length 112 and a width 113. In the example, the length 112 increases as the angled channel 110 extends in the Z direction 38 from the lower end 54 of the sidewall 50 (e.g., adjacent the lower flange 76) toward the upper end 58 of the sidewall 50 (e.g., adjacent upper flange 70). In one example, the width 113 of the channel 110 remains substantially constant in dimension as the angled channel 110 extends in the Z direction 38 from the lower end 54 of the sidewall 50 toward the upper end 58 of sidewall 50 as generally shown. In an alternate example, it is understood that only one of the length 112 or the width 113, for example length 112, may increase as the angled channel extends in the Z direction 38 from the sidewall 50 lower end 54 toward the upper end 58.

Figure 11A:
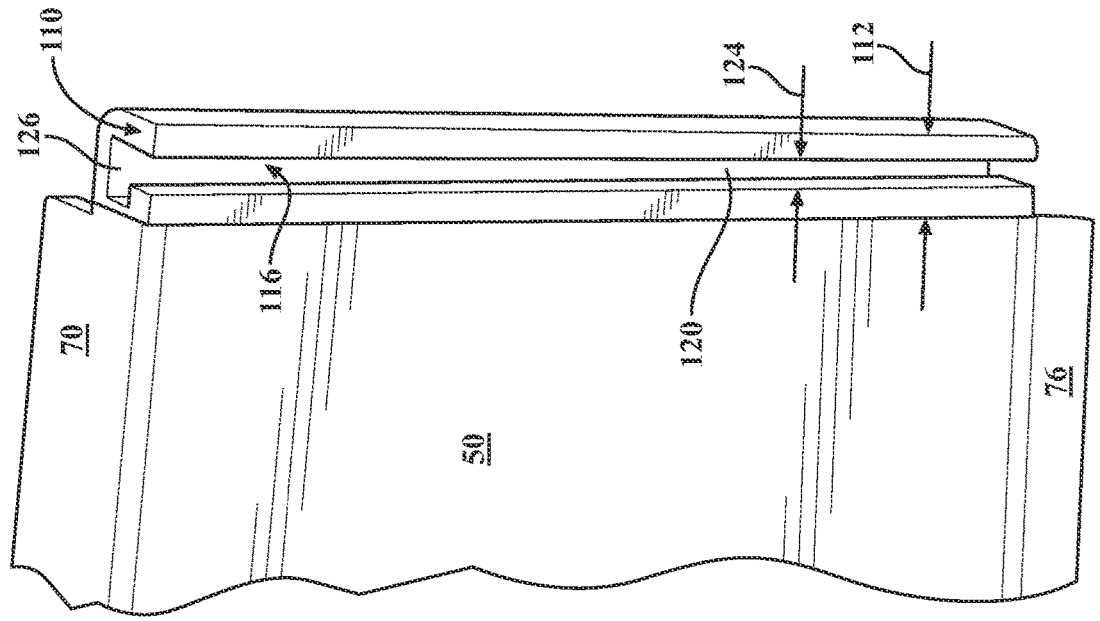
FIG. 11A is a rotated rear perspective view taken in the direction of D of a portion of the sidewall section in FIG. 8.
Figure 11:
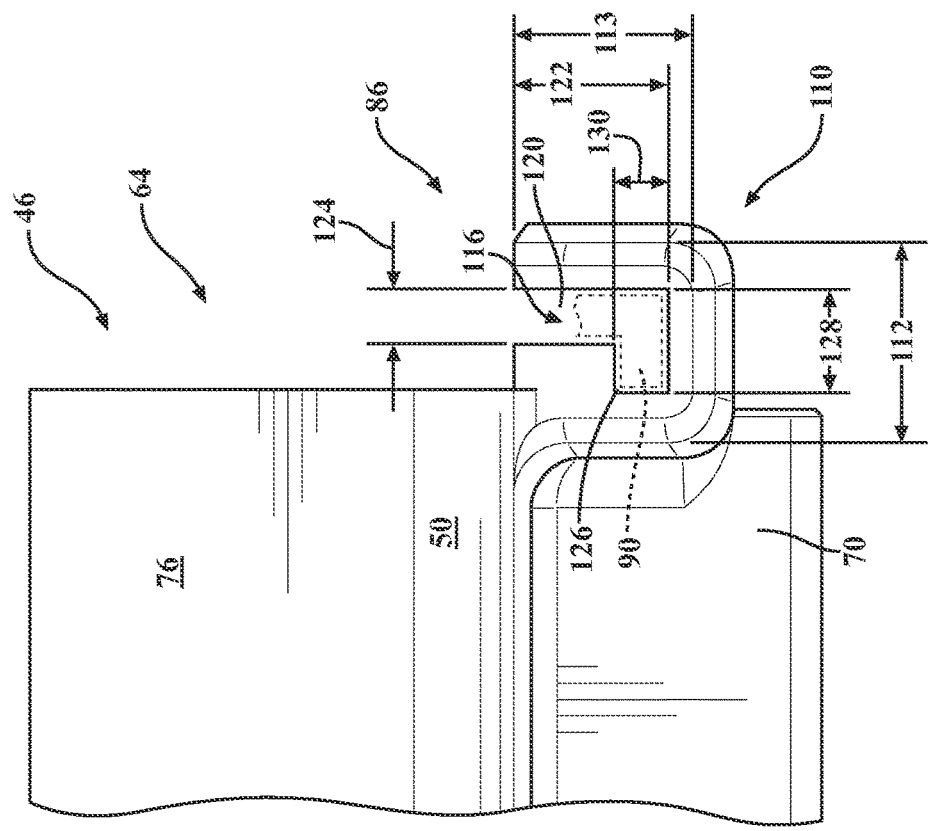
FIG. 11 is an enlarged view of a portion of FIG. 9 identified as "B."

As best seen in the FIGS. 8, 11, and 11A example, the angled channel 110 defines an elongate angled slot 116 having a first portion 120 extending generally transverse (orthogonally 90 degrees) relative to sidewall 50 having a length 122 and a width 124. In one example, the first portion 120 length 122 remains substantially constant in dimension as the angled slot 116 extends in the angled channel 110 in the Z direction 38 from the lower end (adjacent the lower flange 76) of the sidewall 50 toward the upper end 58 of the sidewall 50 (adjacent the upper flange 76). In one example the first portion width 124 of the angled slot 116 increases as the angled slot 116 extends in the angled channel 110 in the Z direction 38 from the lower end 54 of the sidewall 50 toward the upper end 58 of the sidewall 50.

The example angled slot 116 further includes a second portion 126 in communication with the first portion 120 extending substantially transversely (orthogonally 90 degrees) from the first portion 120 as generally shown. The angled slot second portion 126 includes a length 128 and a width 130. In one example of the angled slot 116, the angled slot length 128 and the width 130 of the second portion 126 increase as the angled slot 116 extends in the angled channel 110 in the Z direction 38 from the lower end 54 of the sidewall 50 toward the upper end 58 of the sidewall 50. Although described as the angled slot 116 first portion 120 length 122 remains of substantially constant dimension, and the first portion 120 width 124, and the second portion 126 length 128 and width 130 increase as the angled slot 116 extends from the lower end 54 toward the upper end 58 of the sidewall 50, it is understood that each of these dimensions may vary from as described. In other words, each of these lengths or widths may remain substantially constant, may increase, or may decrease along the angled slot 116 between the lower end 54 and the upper end 58 to suit the particular application and performance requirements. The tapered or angled geometries of the angled tab 90, the angled channel 110, and the angled slot 116 are functionally useful and advantageous for secure and removable connection of adjacent sidewall sections 46, and further advantageous in the efficient and economical manufacture of the sidewall section 46 and housing 14 overall.

In an alternate example (not shown), the angled tab 90 and/or the angled channel 110 and defined slot 116, may not be angled (i.e., the tab 90 and the channel 110 and defined slot 116 respective lengths and widths may be of constant, or substantially constant, dimension between the sidewall 50 lower end 54 and the upper end 58). In this example, the tab 90 lengths 96, 102, and widths 98, 104 may be dimensioned to provide a sufficient interference or frictional fit with the channel 110 (having constant length and width dimensions) for a secure connection between the sidewall sections 46. Alternately, another form or supplementary form of connection device as described herein may be used. It is understood that the angled tab 90, angled channel 110 and angled slot 116 may be of different sizes, shapes, configurations and/or structures to suit the particular application and performance requirements as understood by those skilled in the field.

Figure 15:
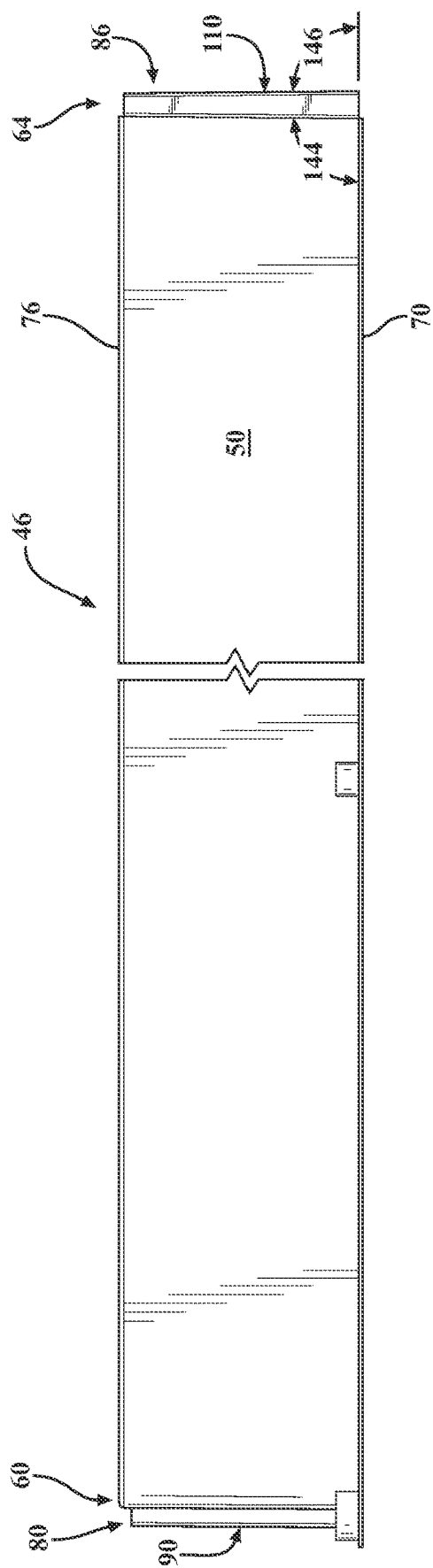
FIG. 15 is an outer front view of an example of the air filter housing sidewall section.
Figure 16:
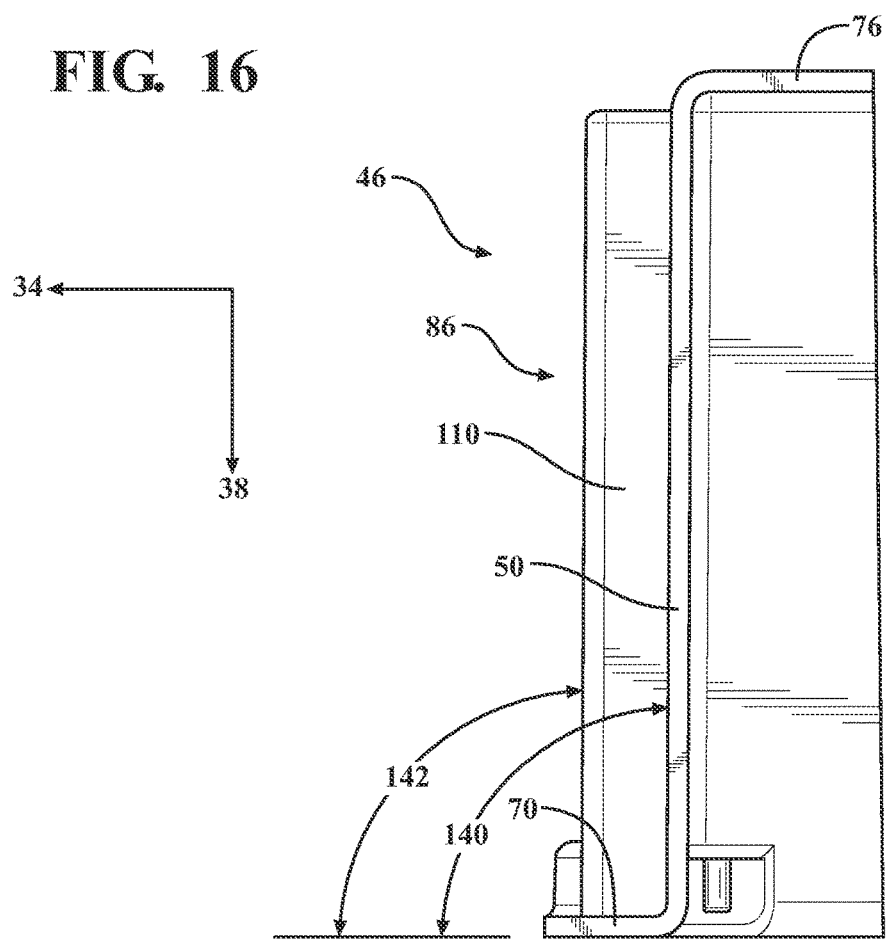
FIG. 16 is an enlarged right side view of FIG. 15.

Referring to the FIGS. 15 and 16 example, exemplary angled channel 110 is positioned or oriented at angles 142, 144 and 146 as generally shown. In one example, angles 142, 144 and 146 are 90.5 degrees as generally shown. Alternate angle value ranges for angles 142, 144 and/or 146 include 90-92 degrees (and any partial or fractional degree therebetween). Alternate angle values, both larger or smaller, for example 90-95 degrees (and any partial or fractional degree therebetween), for angles 142, 144 and/or 146 may be used to suit the particular application and environment. In one example, the above-described angles may also be used for first connector 80 elongate angled tab 90.

In one example (not shown) the described respective increases in the lengths and widths of the angled tab 90, the angled channel 110, and the angled slot 116 as they extend from the sidewall 50 lower end 54 toward the upper end 58, may be reversed (e.g., alternately, the angled tab 90, the angled channel 110, and the angled slot 116 lengths and widths may decrease from the lower end 54 toward the upper end 58 of the sidewalls 50. In an alternate example (not shown), the angled tab 90 may be positioned at the sidewall 50 second end 64, and the angled channel 110 may be positioned at the sidewall 50 first end 60.

Referring to the example described and illustrated in FIGS. 7-11, in the first sidewall connector 80 in the form of the angled tab 90, and the example second sidewall connector 86 in the form of the angled channel 110 and angled slot 116, the angled tab 90 is sized to be complimentary to the angled slot 116. In other words, the respective first portions 94 (angled tab), 120 (angled slot) and the respective second portions 100 (angled tab), 126 (angled slot) fit together in surrounding or coaxial orientation as shown in FIG. 11 (angled tab 90 shown in dashed line).

Figure 14:
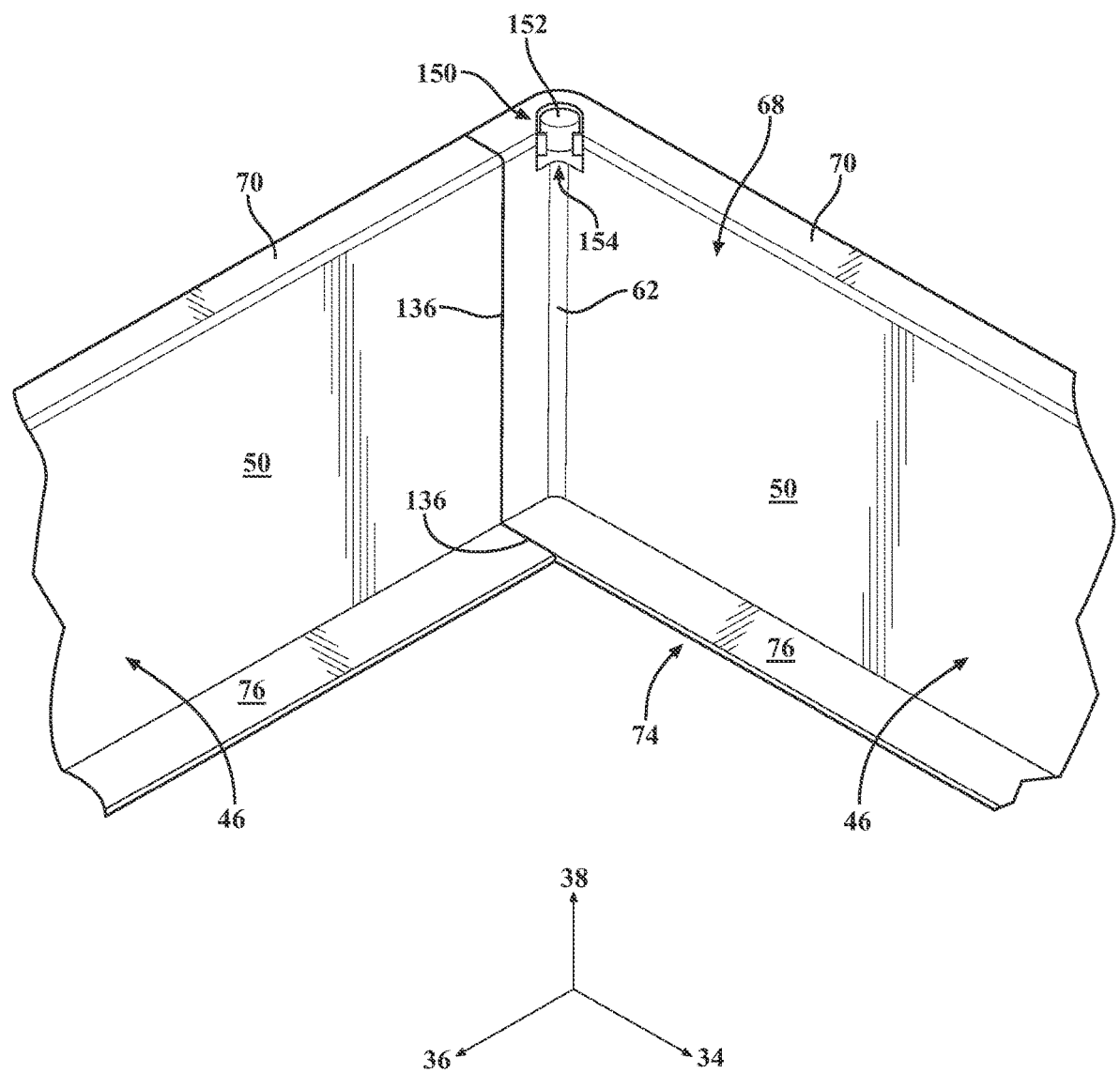
FIG. 14 is an inner perspective view of FIG. 12.

As best seen in the FIGS. 6 and 11 example, when adjacent sidewall sections 46 are to be connected, a sidewall section 46 is axially moved in the Z direction 38 to slidingly engage a first sidewall connector 80 (for example having an angled tab 90) of a sidewall section 46 to a second sidewall connector 86 (for example having an angled channel 110) of an adjacently positioned sidewall section 46. As best seen in FIG. 11, the angled tab 90 is received in the angled slot 116. In one example, the angled tab 90 and complimentary angled slot 116 are sized and/or dimensioned to provide a slight interference fit in one another over at least a portion of the tab 90 and angled channel 110 along the axial Z direction 38 for frictional engagement between angled tab 90 and the angled channel 110 providing for a secure, but removable connection between assembled adjacent sidewall sections 46 forming air filter housing 14 (space shown between angled tab 90 and angled channel 110 shown in FIG. 11 for convenience of illustration only). As best seen in FIG. 14, connected adjacent sidewall sections form a joint 136. In the example shown and described above, the abutting upper flanges 70 form a flush or substantially continuous and/or even surface, and the abutting lower flanges 76 form a flush or substantially continuous and/or even surface to support the filter media 18, for example an air filter cartridge 20.

In the example angled tab 90 and angled channel 110, the described exemplary varying angled slot 116 and angled tab 90 lengths and widths are operable to begin the frictional engagement between the angled tab 90 and the angled channel 110 walls only when the angled tab 90 is engaged by the angled channel 110 walls defining slot 116 when the angled tab 90 is axially positioned about one-half of the way into the elongate slot 116 in the Z direction 38. This example provides frictional engagement between the angled tab 90 and the channel 110 walls in about the last half of the insertion or installation stroke between the complimentary first sidewall connector 80 and the second sidewall 86 connector (e.g., frictional engagement or resistance first begins to occur when the angled tab 90 is about half of the way inserted or installed in the total length of the angled slot 116). Alternate examples may provide for the beginning of the frictional engagement at one-quarter of the insertion length along the Z direction 38, or at three-quarters of the insertion length along the Z direction 38 (which would frictionally engage the adjoining sidewall sections 46 over only one quarter of the tab 90 and slot 116 length). Other examples of variations in sizes, shapes, forms, configurations, and orientations of the angled tab 90 and/or angled slot 116 (or angled channel 110 defining the angled slot 116), as well as the slight interference fit, and the frictional engagement by the first 80 and second 86 sidewall connectors, may be used to suit the particular application and performance requirements as known by those skilled in the art.

In one example, once the sidewall sections 46 are connected or assembled, the respective upper flanges 70 of the connected sidewall sections 46 are aligned, flush and/or are positioned in the same plane providing for an even, flat or planar surface along the top of housing 14 (e.g., at upper flange 70) to engage, for example, the air passage opening frame 28. Similarly, once the adjacent sidewall sections 46 are connected, the respective lower flanges 76 are aligned, flush and/or are positioned in the same plane providing for an even, flat or planar surface along the bottom of the housing 14 (i.e., the inside surface of the lower flanges 76 facing the interior cavity 68 providing a support for the filter media 18).

In an alternate example (not shown) alternate structures or formations in the sidewall sections 46, for example on tab 90 and/or channel 110 may be used to frictionally or otherwise engage adjacent sidewall sections 46 together. For example, one or more protrusions (e.g., a raised bump, dart or button) may be positioned on one of the tab 90 or channel 110 to engage an oppositely positioned and cooperative depression or hole in the other of the tab 90 or channel 110 to positively engage the sidewall section 46 together. Alternate structures and formations may be used as known by those skilled in the art.

Referring to the FIG. 16 example, the position or angular orientation 140 of the sidewall 50 with respect to the upper flange 70 is 90.5 degrees (i.e., the sidewall 50 is oriented to be angled slightly outward from the vertical (for example Z direction 38) away from the interior cavity 68). This angle value is advantageous to eliminate or minimize the passage of air flow 30 between the housing 14 and filter cartridge 20 while maintaining use of efficient and economical manufacturing processes, for example injection molding or vacuum forming. Alternate angle value ranges for angle 140 include 90-92 degrees, 90-97 degrees, 90.5-92 degrees, or 90.5-97 degrees (and any specific angle or fractional angle within these ranges). In one example, angle 140 is 90 degrees. It is understood that different angles values for angles 140, 142, 144 and/or 146, greater in value or lesser in value (and any factional angle therebetween), may be used to suit the particular application, to aid in manufacturing, and/or performance requirements as known by those skilled in the art. It is understood that the housing 14 configuration including the sidewall connector 78 in the form of the angled tab 90 and angled channel 110, in the orientations and angles 140, 142, 144 and 146, may be used with a housing 14 in the two-piece configuration, for example first sidewall section 44 and second sidewall section 44A described herein.

Although air filter housing 14 is illustrated in FIGS. 1-17 as including four (4) modular sidewall sections 46, it is understood that the number and configuration of the sidewall sections 46 may vary. Referring to FIGS. 18A-18E, schematic examples of alternate configurations of housing 14, sidewall sections 46, and sidewall connectors 78 are shown (spaces shown between the sidewall sections shown for convenience of illustration only, and the sidewall connectors shown schematically as lines). In one example where the air filter housing includes at least a first sidewall section 44 and a second sidewall section 44A, it is contemplated that only two sidewall sections 46 may be used to form housing 14 which, when connected defines interior cavity 68, and when installed, surrounds the forced air passage opening 26 as shown in FIG. 1.

Referring to the FIGS. 18A, 18B and 18C examples, alternately configured housing 14A includes a first sidewall section and a second sidewall section similarly constructed and/or configured to the first sidewall section. In the FIGS. 18A and 18B examples, each of the first sidewall section 46A and the second sidewall section 46A are in the shape of a "C" or "U". In the FIG. 18A example, the sidewall connector 78 may be in the form of the integral sidewall connector 78 described and best illustrated in FIGS. 6-13, or alternately may be any of the mechanical or chemical fasteners or methods described herein (e.g., screws, adhesive tapes, interlocking tabs, adhesives, and/or reclosable fastening devices and systems). Referring to the FIG. 18A example, the first and second sidewall sections 46A are configured to overlap adjacent the respective ends which may be more suitable for the use of sidewall connector 78 in the form of mechanical or chemical fasteners described herein.

In the FIG. 18B example, the alternately configured housing 14B first and second sidewall sections 46A are oriented end-to-end and the sidewall connector 78A is in an exemplary form of a separate and independent component, for example a flat or planar plate 82. The plate 82 is connected to each of the sidewall sections 46A by one or more mechanical or chemical fasteners described herein.

In the FIG. 18C example, the alternately configured housing 14C first and second sidewall sections 46B are in the form of a "J" shape. The first and second sidewall sections 46B are connected by sidewall connector 78 in one of the many manners described for housing 14A in FIG. 18A to suit the particular application. It is understood that the FIGS. 18A-C housing 14 examples using a two-piece sidewall section design, may have alternately configured sidewall sections 46 than described and illustrated to suit the particular application and performance requirements.

Figure 18D:
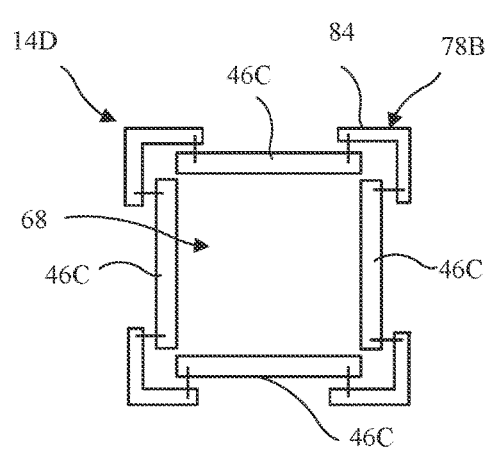

Referring to the FIGS. 18D and 18 E examples, housing 14 is alternately configured using an alternate modular four-piece sidewall section 46 design. Referring to the FIG. 18D example, housing 14D includes four sidewall sections 46C which are configured as substantially straight or planar pieces of the same or similar construction (e.g., no corner portion 62 as shown in FIG. 7). In the example, sidewall connector 78 is in the form of a separate and independent sidewall connector 78B (not integral with the sidewall sections 46). In one example, alternate sidewall connector 78B is in the form of an angled component or angle bracket 84 (four shown). In one example, the angle brackets 84 are connected to each of the adjacent sidewall sections 46C through one or more of the mechanical or chemical fasteners described herein.

Figure 18E:
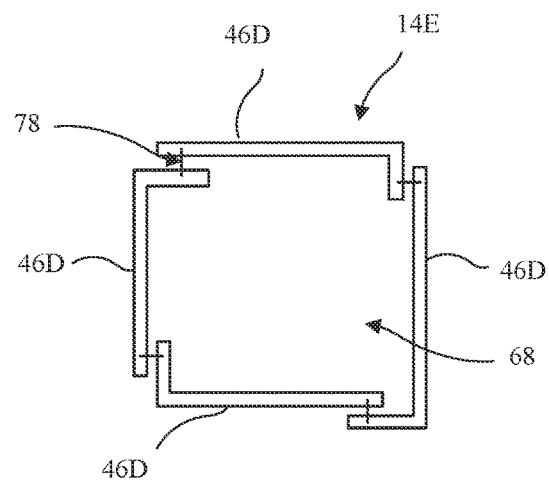

Referring to the FIG. 18E example, housing 14E includes four modular sidewall sections 46D, each configured in an "L" shape wherein portions of the sidewall sections overlap as generally described for FIG. 18A. In one example, the sidewall connector 78 is in one of the forms as described for the housing 14 A in FIG. 18A (e.g., integral to sidewall section 46D or one or more of the mechanical or chemical fasteners described).

Although the alternately configured housings 14A-14E, and alternately configured sidewall sections 46A-46D are illustrated schematically, it is understood that each of the variously described and illustrated sidewall sections 46A-46D may include one or more of the sidewall section 46 constructions or features described above for sidewall section 46 and illustrated in FIGS. 1-13. For example, the alternately described sidewall sections 46A-46D include the first and second ends, the upper and lower ends, and sidewall. The alternately described sidewall sections 46A-46D may also include one or more of the variously described and illustrated filter media stop 74, an upper flange 70, a lower flange 76, and/or housing connector 150. Each of the alternate housings 14A-14E when connected or assembled define an interior cavity 68 for receipt of the filter media 18 to form the air filter assembly 10 and are useful to connect to the air passage frame 28 to serve as an air filtration device as described and illustrated herein.

Referring to FIGS. 3, 12, 14 and 17, exemplary multi-piece air filter housing 14 includes a housing connector 150 operable to secure, connect, and/or engage the connected at least first sidewall section and second sidewall section (e.g., the air filter housing 14) circumferentially around the forced air passage opening 26, for example to frame 28 (FIG. 1). As described above, in one example, housing 14 includes four modular sidewall sections 46. In the form of an air filter assembly 10, the assembled housing 14 receives and supports an air filter media 18 prior to connection of the housing 14 to frame 28. In the exemplary engaged position of the housing 14 to the air passage frame 28, the housing completely, or substantially, circumferentially surrounds the air passage opening 26 and positions the air filter media 18 substantially transverse (orthogonally 90 degrees) to the airflow 30 as generally shown in FIG. 1. In a preferred example, housing connector 150 allows for secure, but removable connection or engagement of the housing 14, or with air filter media 18 installed, air filter assembly 10, to the air passage opening frame 28.

As best seen in FIGS. 2 and 3, in one example application of housing 14 used in a commercial building suspended ceiling 24 frame 28, the frame 28 is commonly made from a metallic or ferrous material including iron, for example light gauge steel. In this exemplary application, housing connector 150 includes at least one, or a plurality of, permanent magnets 152 (eight shown) spaced apart along upper flange 70 as generally shown. In the FIGS. 2 and 3 example (showing use of a first, a second, a third, and a fourth sidewall section 46), each sidewall section 46 includes two round magnets recessed in the Z-direction 38 in the upper flange 70 as further described below. It is understood that different types of magnets, different numbers of magnets (in greater or lesser numbers), and different shapes or forms of magnets 152, may be used to suit the particular application and performance specification as known by those skilled in the art.

Figure 17:
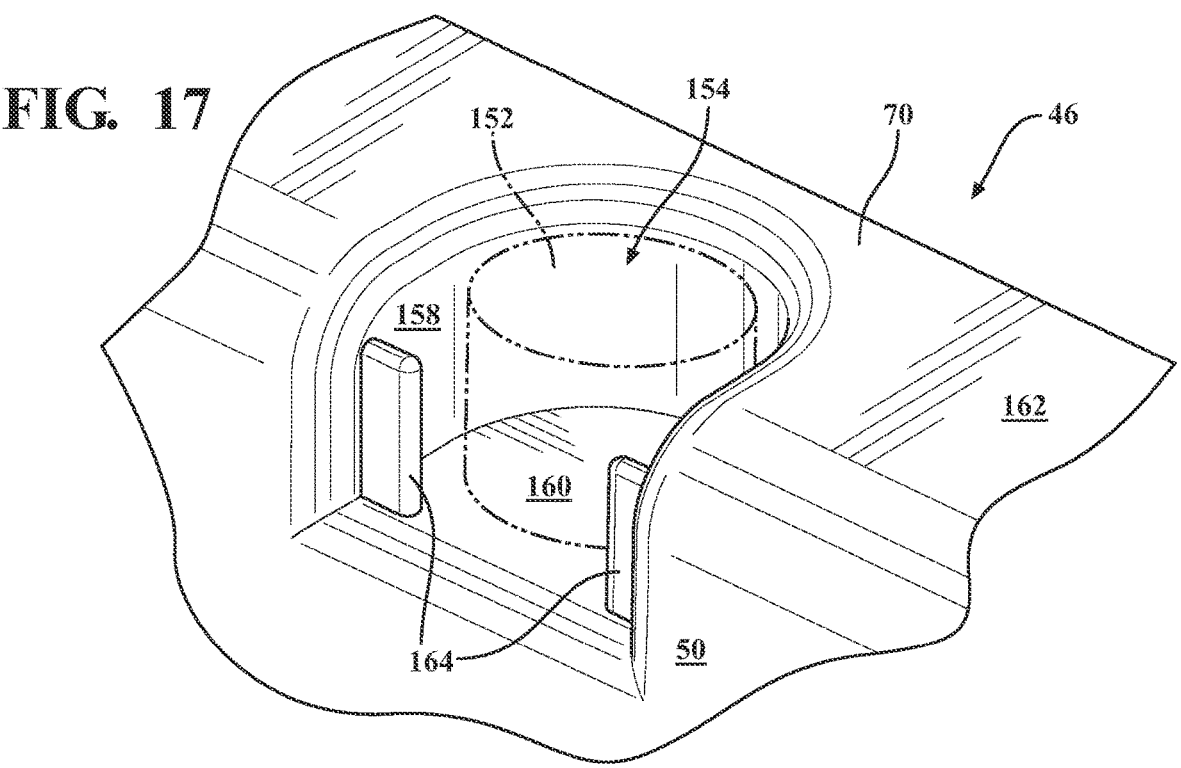
FIG. 17 is an enlarged perspective view of an example of a housing connector including a recessed socket shown with an installed magnet (in phantom line).

As best seen in FIGS. 12, 14 and 17, the magnets 152 are spaced apart in the X 34 and Y 36 directions and mounted in recessed sockets 154 as generally shown. In one example, each recessed socket 154 is integrally formed in the sidewall section 46 upper flange 70 and sidewall 50 as best seen in FIG. 17. Each socket 154 includes an inner wall 158 and a bottom surface 160. The sockets 154 are positioned and sized to receive the housing connector 150, in the example shown an individual magnet 152. In one example, each magnet 152 is permanently mounted in the recessed socket 154 with adhesive. Other devices and methods may be used to secure magnets 152 in the respective socket 154.

In one example of housing connector 150 in the form of magnets 152, each magnet 152 mounted in a recessed socket 154, the bottom surface 160, and/or height of the magnets 152, are positioned or sized so that a top or upper surface of the magnets 152 is positioned adjacent to the sidewall upper end 58. In one example, the magnet 152 upper surface is positioned substantially flush with an upper surface 162 of the upper flange 70. This ensures that the upper flange 70 is placed in all-around abutting contact or engagement with the air passage frame 28 thereby eliminating or minimizing the passage of airflow 30 between the frame 28 and the housing 14, avoiding passage through the filter media 18. Alternately, the socket bottom surface 160 and/or the magnet 152 height are sized to position the upper surface of the magnet slightly below the upper surface 162 of the upper flange 70 to ensure the magnets 152 do not contact the air passage frame 28 prior to contact by the upper flange 70. In an alternate example, the upper surface of the magnets 152 may be positioned to be slightly above the upper surface 162 of the flange 70 to ensure the magnets are in close proximity to the frame 28 to provide secure engagement of the housing 14 to the frame 28. This position may also be beneficial if a seal (not shown) will be used between the flange 70 upper surface 162 and the frame 28.

As best seen in the FIG. 17 example, the housing connector 150 includes at least one tab 164 (two shown) which extend from the inner wall 158 inwardly into the recessed socket 154 and toward each other as generally shown. It has been determined that when mounting a magnet 152 in a recessed socket 154 with adhesive, the tabs 164 eliminate or reduce the occurrence of a vacuum air pocket forming between the magnet 152 and the bottom surface 160 and/or inner wall 158 which improves the permanent mounting of the magnets 152 to the sidewall section 46. Other configurations, shapes, sizes, orientations and numbers of the tabs 164 may be used as known by those skilled in the art.

It is understood that different types of housing connectors 150 may be used to secure or removably connect the air filter housing 14 to the forced air device, for example, the HVAC forced air opening 26 or the frame 28, or the housing of an electric circulation fan. It is understood that the numbers of housing connectors 150, and/or the spacing and orientation of the housing connectors 150 relative to the housing 14, may vary to suit the particular application. For example, housing connector 150 may alternately, or cooperatively, use interlocking or reclosable mechanical attachment devices, for example, hook and loop fasteners such as VELCRO®, Dual-Lock, adhesive tapes, and other similar devices which provide a secure, but low height or profile. The housing connector 150 may alternately, or cooperatively, use common mechanical fasteners such as screws, spring clips or clamps, or other known mechanical fastening devices. The described magnets 152 and alternate connectors may be connected to the upper flange 70, or recessed in suitably sized and configured sockets or pockets as described for recessed sockets 154. Other types of housing connectors 150 to suit the particular application or performance specifications known by those skilled in the art may be used.

It is further understood that different configurations of housing 14, 14A-E, sidewall sections 46, 46A-D (subsequently referred generally as sidewall 46 for convenience), and/or housing connectors 150 may be used to provide a secure, removable connection of the housing 14 (and air filter assembly 10) to the air passage opening frame 28. In one example (not shown), the sidewall sections 46 may not include an upper flange 70 and the housing connectors 150, for example magnets 152, are connected to the sidewall 50 in an area, or adjacent to, the sidewall 50 upper end 58. In another example (not shown), recessed sockets 154 may be eliminated and the housing connector 150, for example magnets 152, are mounted on the lower, or underside, of the upper flange 70 not in directly abutting contact with the air passage opening frame 28. Other variations, configurations, formations, and components useful to removably connect housing 14 to air passage opening frame 28 allowing replacement of the filter media 18 from the housing 14 known by those skilled in the art may be used.

Although various examples of housings 14, sidewall sections 46, sidewall connectors 78, and housing connectors 150 are described, it is understood that the variously described components and configurations may be interchanged with other of the described housing 14 components and configurations. For example, each of the various sidewall section 46 components, configurations, features and/or variations (e.g., sidewall 50, first end 60, second end second end 64, corner portion 62, and/or upper flange 70) may be used with any of the housing 14 configurations (e.g., housings 14, 14A-E) described and/or illustrated herein. Equally, each of the variously described sidewall connectors 78 may be used with any of the housing 14 configurations described and/or illustrated herein. Also, the variously described filter media stops 74 (for example lower flange 76 or alternate protrusions as described) may be used with any of the housing 14 configurations described and/or illustrated herein. Equally, the variously described housing connectors 150 may be used with any of the housing 14 configurations described and/or illustrated herein. Also, the air filter assembly 10 including filter media 18 (for example filter cartridge 20) may be used with any of the various housing 14 configurations and variously described alternate components described and/or illustrated herein.

These singularly included, or combination, of structures and/or features to form the examples of housing 14 described and/or illustrated herein, each may include the variously described features and orientations of the angles 140, 142, 144 and/or 146, and each may include the housing air passage opening 77A which is unobstructed by the housing 14 providing the benefits and advantages as described herein.

Figure 19:
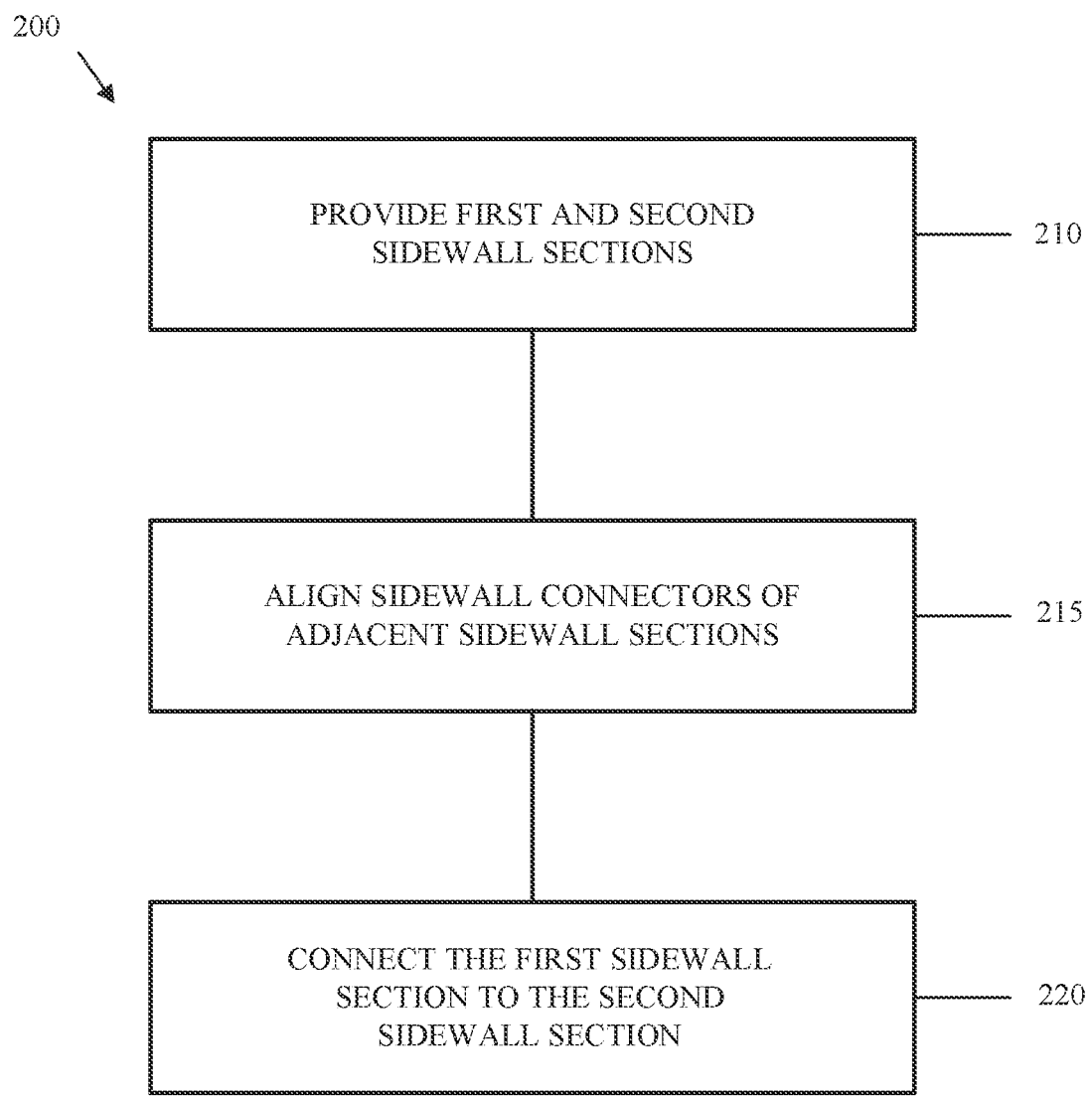
FIG. 19 is a schematic flow chart of an example of a method for assembling a multi-piece air filter housing.

Referring to FIG. 19, an example of a method 200 for assembling an air filter housing 14 is shown. Exemplary step 210 includes providing at least a first sidewall section 44 and a second sidewall section 44A. In one example, the at least first sidewall section 44 and the second sidewall section 44A include a total of four (4) modular sidewall sections 46, a first sidewall section, a second sidewall section, a third sidewall section, and a fourth sidewall section 46 of the same, or substantially the same, dimensional, structural and functional features as described above and/or illustrated.

Step 215 includes aligning sidewall connectors 78 of adjacently-positioned sidewall segments 46. In one example, each sidewall section 46 includes an integral first sidewall connector 80 positioned at a first end 60 of the sidewall 50, and second sidewall connector 86 positioned at a second end 64 of the sidewall 50. In one example the first sidewall connector 80 is the elongate angled tab 90, and the second sidewall connector 86 is the elongate angled channel 110 defining angled slot 116 described above and/or illustrated. In alternate examples of sidewall connectors 78 described above, for example separate sidewall connectors, for example angle brackets, are used connect adjacently-positioned sidewalls 50. These alternate, separate sidewall connectors are aligned or positioned with the respective sidewall 50, or other structures of the sidewall sections 46, and are operable to securely connect the adjacent sidewall sections 46 together to suit the particular configuration of sidewall 50.

Step 220 includes connecting the at least first sidewall section 44 to the second sidewall section 44A with the sidewall connector 78 forming a rigid, or semi-rigid, air filter housing 14 defining an internal cavity 68. As describe above, in one example of housing 14, four modular sidewall sections 46 are used. In one example, the first sidewall connector 80 is the integral angled tab 90, and the second sidewall connector is the integral angled channel 110 defining an angled slot 116 as described above. The angled tab 90 is axially slidingly positioned in the angled slot 116 whereby the angled tab 90 is progressively frictionally engaged with the angled channel 110 to removably and securely connect the sidewall sections 46 together forming the assembled housing 14. In the examples described and illustrated, the angled tab 90 of the first sidewall section 44 is aligned and received in the angled channel 110 angled slot 116 of the adjacently-positioned second sidewall section 44A, and the angled tab 90 of the second sidewall section 44A is aligned and axially received in the angled channel 110 and angled slot 116 of the adjacently-positioned first sidewall section 44. In an alternate example, the at least first sidewall section 44 and the second sidewall section 44A include four modular sidewall sections 46, each of the four sidewall sections 46 angled tabs 90 and angled channels 110 are connected together to form the air filter housing 14 defining the internal cavity 68 as described above and/or illustrated.

In one optional step (not shown) a housing connector 150 is connected or attached to the at least first sidewall section 44 and the second sidewall section 44A, for example each sidewall section 46 (e.g., where four modular sidewall sections 46 are used). In one example, the housing connector 150 includes at least one, or a plurality of, magnets 152 connected to the upper flange 70 of each sidewall section 46. In another example described above, each magnet 152 is positioned in a recessed socket 154. Alternate examples of housing connectors 150 and their operations are described above. When the sidewall sections are connected, the housing 14 is assembled and ready to receive a filter media 18 and be connected to a forced-air device, for example a HVAC system as shown and described for FIG. 1.

In an alternate step (not shown), when the housing 14 is not needed to filter the air and improve air quality in a working space 32, the housing 14 can be disassembled and compactly stored through release of the sidewall connectors and disengagement of the sidewall sections 46 from each other. This is an advantage over conventional and/or one piece air filter designs which are large, bulky and take up considerable space when not in use and placed in storage.

Figure 20:
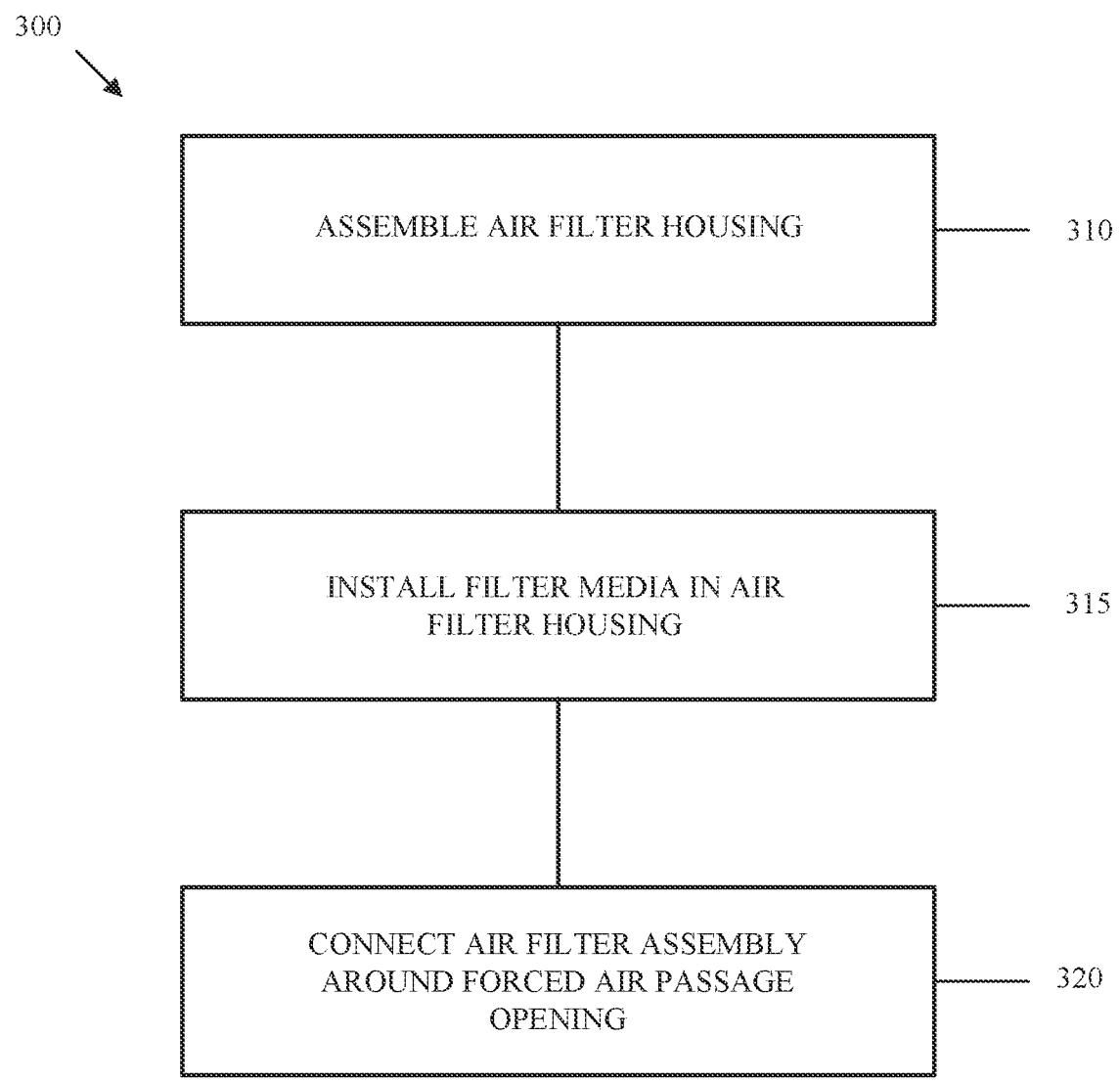
FIG. 20 is a schematic flow chart of an example of a method for installing an air filter assembly.

Referring to FIG. 20, an example of a method 300 for assembling and installing an air filter assembly 10 to a forced air device, for example a HVAC forced air passage opening 26 defined by a suspended ceiling support grid frame 28, or other air circulation device, for example an electric circulation fan frame, is shown. Exemplary step 310 includes assembling a multi-piece air filter air filter housing 14 having at least a first sidewall section 44 and a second sidewall section 44A. In one example, four modular sidewall sections 46 are used and connected together as described above and/or illustrated. In one example, exemplary step 310 includes the method 200 for assembling the air filter housing 14 described and illustrated in FIG. 18.

In step 315, a filter media 18 is installed in the assembled housing 14 interior cavity 68 in abutting engagement with the filter media stop 74 which supports the filter media 18 in the interior cavity 68 relative to the housing 14. The assembled air filter housing 14 with the installed air filter media 18 forms the air filter assembly 10. In one example, the filter media 18 includes a commercial air filter cartridge 20. In one example, the filter media stop 74 is a lower flange 76 described above which supports the filter media 18 positioned in the internal cavity 68 as described above and/or illustrated. It is understood that the method step 315 may include the alternately described housing 14 configurations and alternate filter media stops 74 described herein.

Exemplary step 320 includes connecting or securing the assembled housing 14 and installed filter media 18 (as an air filter assembly 10) circumferentially surround a forced air passage opening 26. In one example the forced air passage opening is defined by an air passage frame 28. In one example, the frame 28 includes a suspended ceiling 24 support grid made from a metallic or ferrous material as described herein. In an alternate example, the frame 28 is a frame or housing of a forced air circulation device such as an electric circulation fan. In one example of step 320, a housing connector 150 connected to the housing 14 is operable to connect the air filter assembly 10 to the frame 28. Once connected to the frame 28 and circumferentially positioned around the air passage opening 26, the connected air filter assembly 10 is operable to direct forced air 30 through the filter media 18 to either inside a working space 32, or from a working space 32.

In an optional step (not shown), on a need for replacement of the filter media 18 in the installed air filter assembly 10, the housing 14 is disconnected from the frame 28 and from around the forced air passage opening 26, the air filter media 18 is removed from the interior cavity 68, and a new or refreshed air filter media 18 is installed in the housing 14 interior cavity 68 in engagement with the filter media stop 74 as describe and illustrated in the examples described herein. The air filter assembly 10 is then reconnected to the frame 28 circumferentially around the forced air passage opening 26 as described.

It is understood that additional method steps may be added, eliminated, and/or conducted in a different order than described for methods 200 and/or 300 to suit the particular application as known by those skilled in the art.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An air filter housing for use with an air filter media, the air filter housing comprising:
   at least a first sidewall section and a second sidewall section, each of the first sidewall section and the second sidewall section further comprising:
      a sidewall having a first end and a second end separated in one of an X-direction or a Y-direction, and an upper end and a lower end separated in a Z-direction; and
      a filter media stop connected to the sidewall of at least one of the first sidewall section or the second sidewall section, the filter media stop extending inward from the sidewall in one of the X-direction or the Y-direction;
   a sidewall connector operable to connect one of the first end or the second end of the sidewall of one of the first sidewall section or the second sidewall section to the other of the first end or the second end of the sidewall of the other of the first sidewall section or the second sidewall section, the sidewall connector further comprising:
      a first sidewall connector integral to the first end of the sidewall; and
      a second sidewall connector integral to the second end of the sidewall, the second sidewall connector is complementary to the first sidewall connector, the first sidewall connector and the second sidewall connector operable to connect the second end of the first sidewall section to the first end of the second sidewall section, and the second end of the second sidewall section to the first end of the first sidewall section, wherein the connected first sidewall section and the second sidewall section define an internal cavity operable to receive a filter media; and
   a housing connector operable to secure the connected first sidewall section and the second sidewall section circumferentially around a forced air passage opening.

2. The air filter housing of claim 1, wherein the first sidewall connector comprises an elongate angled tab axially extending in the Z-direction; and
   the second sidewall connector defines an elongate angled channel axially extending in the Z-direction defining an elongate angled slot complimentary to the elongate angled tab, the elongate angled tab is axially received in the elongate angled slot and slidingly engages the angled channel to connect the first sidewall section to the second sidewall section.

3. The air filter housing of claim 2, wherein
   the angled tab further comprises:
      an angled tab first portion having a length and a width; and
      an angled tab second portion in communication with the angled tab first portion, the angled tab second portion having a length and a width, wherein the angled tab second portion length and width increase as the angled tab extends from the sidewall lower end toward the sidewall upper end; and
   the angled slot further comprises:
      an angled slot first portion having a length and a width; and
      an angled slot second portion in communication with the angled slot first portion, the angled slot second portion having a length and a width, wherein the angled slot first portion width and the angled slot second portion length and width increase as the angled slot extends from the sidewall lower end toward the sidewall upper end.

4. The air filter housing of claim 1, wherein the at least first sidewall section and the second sidewall section comprise four modular sidewall sections including the first sidewall section, the second sidewall section, a third sidewall section, and a fourth sidewall section, each sidewall section having the sidewall, the first end and the second end, the upper end and the lower end, and the filter media stop.

5. The air filter housing of claim 1, wherein the filter media stop comprises a lower flange connected to the sidewall, the lower flange extending inward into the internal cavity and along the sidewall between the first end and the second end, the lower flange having a distal end positioned inward from the sidewall, on connection of the first sidewall section to the second sidewall section the respective distal ends define a housing air passage opening operable to allow forced air to pass through the filter media and the housing air passage opening.

6. The air filter housing of claim 5, wherein the lower flange is connected to the lower end of the sidewall.

7. An air filter housing for use with an air filter media, the air filter housing comprising:
   at least a first sidewall section and a second sidewall section, each of the first sidewall section and the second sidewall section further comprising:
      a sidewall having a first end and a second end separated in one of an X-direction or a Y-direction, and an upper end and a lower end separated in a Z-direction; and
      a filter media stop connected to the sidewall of at least one of the first sidewall section or the second sidewall section, the filter media stop extending inward from the sidewall in one of the X-direction or the Y-direction;
   a sidewall connector operable to connect one of the first end or the second end of the sidewall of one of the first sidewall section or the second sidewall section to the other of the first end or the second end of the sidewall of the other of the first sidewall section or the second sidewall section, wherein the connected first sidewall section and the second sidewall section define an internal cavity operable to receive a filter media; and
   a housing connector operable to secure the connected first sidewall section and the second sidewall section circumferentially around a forced air passage opening, wherein the housing connector comprises a magnet connected adjacent to the upper end of the sidewall.

8. The air filter housing of claim 7, wherein the each of the at least first sidewall section and the second sidewall section further comprise an upper flange connected to the upper end of the sidewall and extending outward from the sidewall, the magnet connected to the upper flange.

9. The air filter housing of claim 8, wherein the upper flange comprises an upper surface and defines a recessed socket extending downward from the upper surface in the Z-direction, the recessed socket operable to receive the magnet whereby an upper surface of the magnet is substantially flush with the upper surface of the upper flange.

10. The air filter housing of claim 9, wherein the housing connector further comprises at least one tab extending into the recessed socket, the at least one tab operable to position the magnet in the recessed socket.

11. An air filter assembly for use over a forced air passage opening, the air filter assembly comprising:
  an air filter housing comprising a modular first sidewall section, a second sidewall section, a third sidewall section, and a fourth sidewall section, each of the first sidewall section, the second sidewall section, the third sidewall section, and the fourth sidewall section further comprising:
    a sidewall having a first end and a second end separated in one of an X-direction or a Y-direction, and an upper end and a lower end separated in a Z-direction; and
    a lower flange connected to the sidewall adjacent to the lower end, the lower flange having a distal end positioned inward from the sidewall;
  a sidewall connector operable to connect one of the first end or the second end of the sidewall of the respective first, second, third or fourth sidewall section to the other of the first end or the second end of the sidewall of an adjacently positioned first, second, third, or fourth sidewall section, the sidewall connector further comprising:
    a first sidewall connector integral to the first end of each sidewall, the first sidewall connector further comprising an elongate angled tab axially extending in the Z-direction; and
    a second sidewall connector integral to the second end of each sidewall, the second sidewall connector complementary to the first sidewall connector, the second sidewall connector further comprising an elongate angled channel axially extending in the Z-direction defining an elongate angled slot complimentary to the elongate angled tab, the elongate angled tab is axially received in the elongate angled slot and slidingly engages the elongate angled channel to connect the respective first, second, third or fourth sidewall section to an adjacently positioned first, second, third, or fourth sidewall section, wherein the connected first, second, third, and fourth sidewall sections define an internal cavity and the distal ends of the lower flanges defining a housing air passage opening;
  an air filter media positioned in the internal cavity and abuttingly engaged with the lower flange, the air filter media covering the housing air passage opening; and
  a housing connector operable to secure the connected first, second, third and fourth sidewall section circumferentially around the forced air passage opening, wherein forced air passing through the forced air passage opening flows through the air filter media and through the housing air passage opening.

12. The air filter assembly of claim 11, wherein each of the first sidewall section, the second sidewall section, the third sidewall section, and the fourth sidewall section further comprise an upper flange connected to the upper end of the sidewall and extending outward from the sidewall.

13. The air filter assembly of claim 11, wherein the housing air passage opening is unobstructed by the air filter housing between the lower flange distal ends allowing substantially all of the filter media to be visibly seen through the housing air passage opening from a working space.

14. A method for assembling an air filter, the method for assembling the air filter housing comprising:
  providing at least a first sidewall section and a second sidewall section, each sidewall section having a sidewall, a first end and a second end separated in one of an X-direction or a Y-direction, an upper end and a lower end separated in a Z-direction, and a filter media stop;
  providing a sidewall connector including a first sidewall connector having an angled tab integral with the first end of each sidewall and a second sidewall connector having an angled channel defining an angled slot integral with the second end of each sidewall;
  aligning the respective angled tab of the first sidewall section and the angled channel of the second sidewall section, and the angled tab of the second sidewall section to the angled channel of the first sidewall section; and
  connecting the first sidewall section and the second sidewall section together by the sidewall connector, by axially inserting the respective angled tab of the first sidewall section and the angled channel of the second sidewall section, and the angled tab of the second sidewall section to the angled channel of the first sidewall section to frictionally engage and connect the first sidewall section to the second sidewall section, the connected first sidewall section and the second sidewall section forming an air filter housing defining an interior cavity operable to receive an air filter media engageable with the filter media stop.

15. The method of claim 14, further comprising:
  inserting the air filter media in the interior cavity in abutting engagement with the filter media stop.

16. An air filter assembly for use over a forced air passage opening, the air filter assembly comprising:
  an air filter housing comprising a modular first sidewall section, a second sidewall section, a third sidewall section, and a fourth sidewall section, each of the first sidewall section, the second sidewall section, the third sidewall section, and the fourth sidewall section further comprising:
    a sidewall having a first end and a second end separated in one of an X-direction or a Y-direction, and an upper end and a lower end separated in a Z-direction;
    a lower flange connected to the sidewall adjacent to the lower end, the lower flange having a distal end positioned inward from the sidewall; and
    an upper flange connected to the upper end of the sidewall and extending outward from the sidewall, the upper flange having an upper surface and defining a recessed socket extending downward from the upper surface in the Z-direction;
  a sidewall connector operable to connect one of the first end or the second end of the sidewall of the respective first, second, third or fourth sidewall section to the other of the first end or the second end of the sidewall of an adjacently positioned first, second, third, or fourth sidewall section, wherein the connected first, second, third, and fourth sidewall sections define an internal cavity and the distal ends of the lower flanges defining a housing air passage opening;
  an air filter media positioned in the internal cavity and abuttingly engaged with the lower flange, the air filter media covering the housing air passage opening; and a housing connector operable to secure the connected first, second, third and fourth sidewall section circumferentially around the forced air passage opening, the housing connector comprising a magnet positioned in the recessed socket whereby an upper surface of the magnet is substantially flush with the upper surface of the upper flange, wherein forced air passing through the forced air passage opening flows through the air filter media and through the housing air passage opening.

17. The air filter assembly of claim 16, wherein the forced air passage opening is defined by a suspended ceiling support frame comprising a ferrous material, the magnet connected to the upper flange of the respective first, second, third, and fourth sidewall sections is operable to removably magnetically connect the upper flange to the support frame.

\* \* \* \* \*